(12) United States Patent
Mathias et al.

(10) Patent No.: US 10,497,280 B2
(45) Date of Patent: Dec. 3, 2019

(54) METHOD OF GESTURE SELECTION OF DISPLAYED CONTENT ON A GENERAL USER INTERFACE

(71) Applicant: LingoZING Holding LTD, Valletta (MT)

(72) Inventors: Michael John Mathias, Las Vegas, NV (US); Kyra Zinaida Pahlen, Los Angeles, CA (US)

(73) Assignee: LingoZING Holding LTD, Valletta (MT)

( * ) Notice: Subject to any disclaimer, the term of this patent is extended or adjusted under 35 U.S.C. 154(b) by 411 days.

(21) Appl. No.: 15/234,513

(22) Filed: Aug. 11, 2016

(65) Prior Publication Data

US 2016/0358511 A1 Dec. 8, 2016

Related U.S. Application Data

(63) Continuation of application No. 14/732,226, filed on Jun. 5, 2015.

(51) Int. Cl.
*G09B 19/06* (2006.01)
*G06F 3/0482* (2013.01)
*G06F 3/0488* (2013.01)
*G09B 5/12* (2006.01)
*G06F 3/16* (2006.01)
*G06F 3/0484* (2013.01)

(52) U.S. Cl.
CPC ............ *G09B 19/06* (2013.01); *G06F 3/0482* (2013.01); *G06F 3/04842* (2013.01); *G06F 3/04883* (2013.01); *G06F 3/167* (2013.01); *G09B 5/125* (2013.01)

(58) Field of Classification Search
CPC .... G06F 3/04883; G06F 3/017; G06F 3/0414; G06F 3/0488
See application file for complete search history.

(56) References Cited

U.S. PATENT DOCUMENTS

| 2008/0033712 | A1* | 2/2008 | Yang | G09B 5/06 704/3 |
| 2009/0300554 | A1* | 12/2009 | Kallinen | G06F 3/04883 715/863 |
| 2011/0316769 | A1* | 12/2011 | Boettcher | G06F 1/1684 345/156 |

(Continued)

OTHER PUBLICATIONS

PCT Notification, International Search Report and Written Opinion, dated Apr. 28, 2016, 17 pages.

(Continued)

*Primary Examiner* — Jerry-Daryl Fletcher
(74) *Attorney, Agent, or Firm* — Barley Snyder

(57) ABSTRACT

A method of gesture selection of displayed content on a general user interface is provided. The method includes steps of: determining a gesture initiation location when a user pushes down on the general user interface, determining a continuous arc by movement of the user across the general user interface, determining a completed continuous arc of the continuous arc by connecting the gesture initiation location with a gesture end location when the user lifts off of the general user interface, determining a selection area based on an inner area of the completed continuous arc, and storing data from objects of interest encompassed in the selection area.

22 Claims, 25 Drawing Sheets

(56) References Cited

U.S. PATENT DOCUMENTS

2014/0218299 A1* 8/2014 Kataoka .............. G06F 3/04883
                                                    345/168
2015/0051898 A1   2/2015 Cuthbert et al.
2015/0052430 A1   2/2015 Dwan
2015/0084852 A1*  3/2015 Shon ...................... G06F 3/005
                                                    345/156

OTHER PUBLICATIONS

Anonymous: "understanding eyespeak feedback", May 30, 2015, XP055247803, Retrieved from Internet: URL: https://web.archive.org/web/20150530131818/http://www.eyespeakpro.com/assets/English/help/Understand%20Feeback.htm, retrieved on Feb. 5, 2016, the whole document.
International Preliminary Report on Patentability, dated Dec. 14, 2017, 11 pages.
European Patent Office Communication, Application No. 15 813 974.1, dated Jul. 17, 2019, 4 pages.

* cited by examiner

METHOD OF GESTURE SELECTION OF DISPLAYED CONTENT ON A GENERAL USER INTERFACE

CROSS-REFERENCE TO RELATED APPLICATIONS

This application is a continuation claiming the benefit of the filing dates under 35 U.S.C. § 119(e) of Non-Provisional patent application Ser. No. 14/732,226, filed Jun. 5, 2015.

FIELD OF THE INVENTION

The invention relates to a method of gesture selection and, more particularly, to a method of gesture selection of displayed content on a general user interface

BACKGROUND

Providing pedagogical assistance through technological devices for people seeking to learn foreign languages is an area of technology that has been explored since computers developed sufficient multimedia capabilities to record and play a sound file which could be correlated to text or images displayed on the screen. Until now these capabilities have been underused. Computerized linguistic learning software has mainly been used to present traditional language-learning exercises in a digitized format, and has never fully harnessed the potential of the technology.

Now that mobile touchscreen computing devices are commonly available that contain speakers, microphones, and high definition visual displays, all of these can be leveraged to provide a more engaging method of learning a foreign language; creating a pedagogical immersion system that enables a language learner to more quickly and easily acquire proficiency in a new language.

SUMMARY

A method of gesture selection of displayed content on a general user interface is provided. The method includes steps of: determining a gesture initiation location when a user pushes down on the general user interface, determining a continuous arc by movement of the user across the general user interface, determining a completed continuous arc of the continuous arc by connecting the gesture initiation location with a gesture end location when the user lifts off of the general user interface, determining a selection area based on an inner area of the completed continuous arc, and storing data from objects of interest encompassed in the selection area.

BRIEF DESCRIPTION OF THE DRAWINGS

The invention will now be described by way of example with reference to the accompanying Figures of which.

DETAILED DESCRIPTION OF THE EMBODIMENT(S)

The invention will now be described in greater detail with reference to an embodiment including the attached figures.

A language learning system 1 according to the invention will be described through exemplary embodiments as shown in the Figures. The language learning system 1 employs software and hardware to review and convert between a native language and a secondary translation of the native language through a framework of pictorial images of non-linguistic contextual cues that work with the linguistic elements to enhance the user's understanding of lexical material as related to the native language and the translation into the secondary language.

Figure 1:
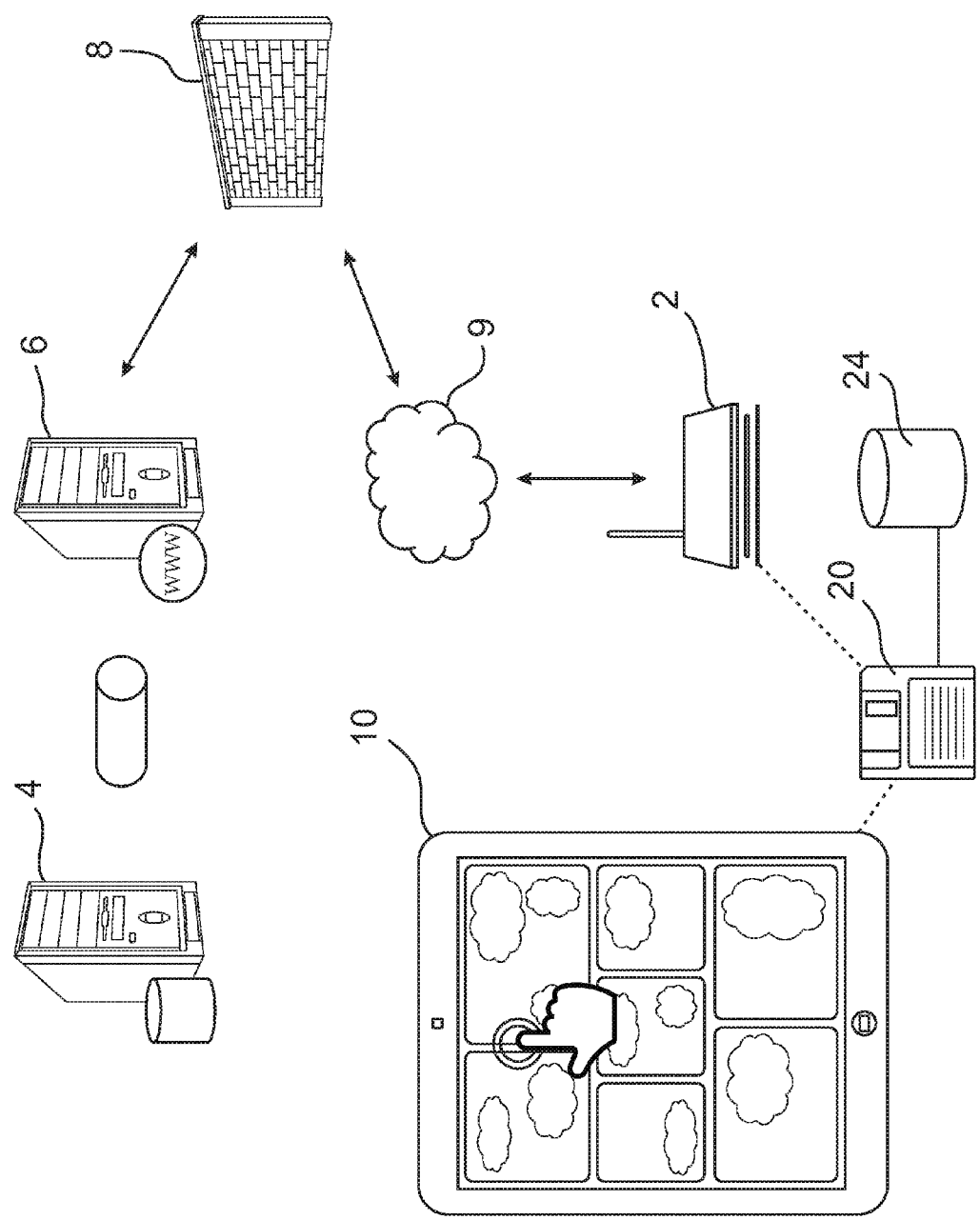
FIG. 1 is a flow diagram of hardware infrastructure for a language learning system according to the invention.

Referring first to FIG. 1, hardware infrastructure for an embodiment of the language learning system 1 will be described. In an exemplary embodiment, the language learning system 1 is built on a network router 2 (for instance, a wireless router) and connected to a database server 4, while also utilizing known hardware components, including a web server 6, a firewall 8, a network 9, and the computing device 10.

The language learning system 1 allows a user to access to a plurality of language learning files 20 that includes multilingual data 24, such as information and images, through the computing device 10 and a network traffic information on the database server 4 (i.e. SQLServer or WindowsServer2012 or newer) that connects to a web server 6. The web server 6 functions as a way for network router 2 to communicate to the database server 4 through an application-programming interface (API) between the computing device 10 and the database server 4. A firewall 8 is integrated for security purposes such as, but is not limited to, blocking unauthorized access to the web server 6 and permitting unauthorized communication thereto. The language learning system 1 is designed to run through the computing device 10 through the language learning files 20 that are downloaded over personal area networks (PANs), local area networks (LANs), campus area networks (CANs), wide area networks (WANs), metropolitan area networks (MANs) and any new networking system developed in the future. These networks are represented with the network 9. One skilled in the art should appreciate that the language learning system 1 can be maintained solely through the computing device 10, as the language learning files 20 can be pre-loaded to the computing device 10. In the shown embodiment, the user connects to the network router 2 using the computing device 10 through the network 9.

Figure 2:
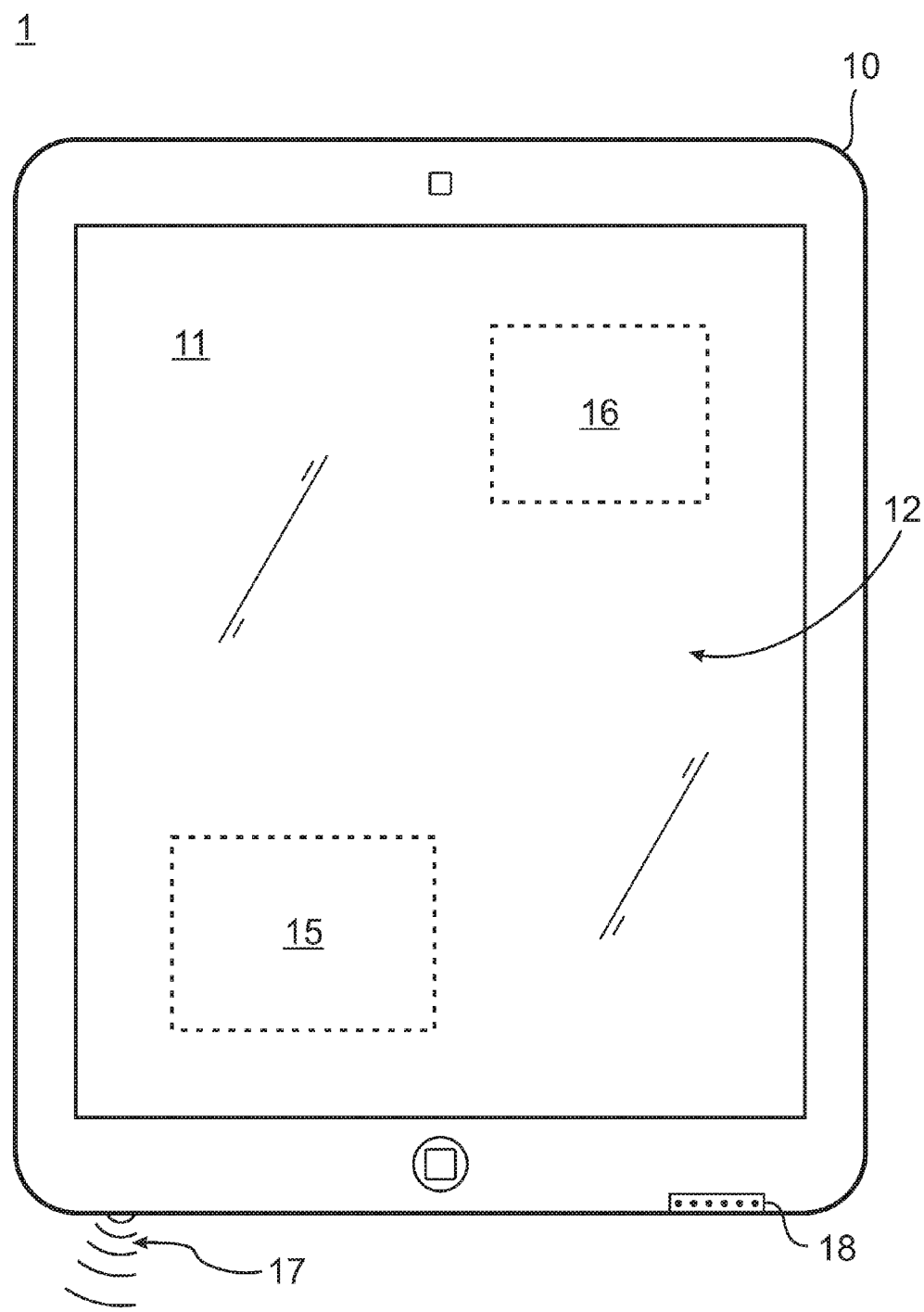
FIG. 2 is a schematic diagram of a connection device of the language learning system according to the invention.

With reference to FIG. 2, the computing device 10 will be described. The computing device 10 generally includes a general user interface 12, a memory device 15, and a processor 16. In the shown embodiment, the computing device 10 is a tablet computer with a touchscreen display 11. The computing device 10 includes sensors, including an audio output device 17 and an audio input device 18. The audio output device 17 may be a speaker or an audio jack, while the audio input device 18 may be an internal microphone. The touchscreen display 11 uses finger or stylus gestures to navigate the general user interface 12. However, one skilled in the art should appreciate that other implements could be used; including a computer mouse, a keyboard, or joystick. In fact, one skilled in the art should appreciate that the computing device 10 is a physical computer and could be, but not limited to, a desktop computer, a laptop computer, or a cell phone. The memory device 15 is a storage device having computer components and recording media used to retain digital data. The processor 16 is a central processing unit (CPU) that manipulates data stored in the memory device 15 by performing computations.

Figure 3:
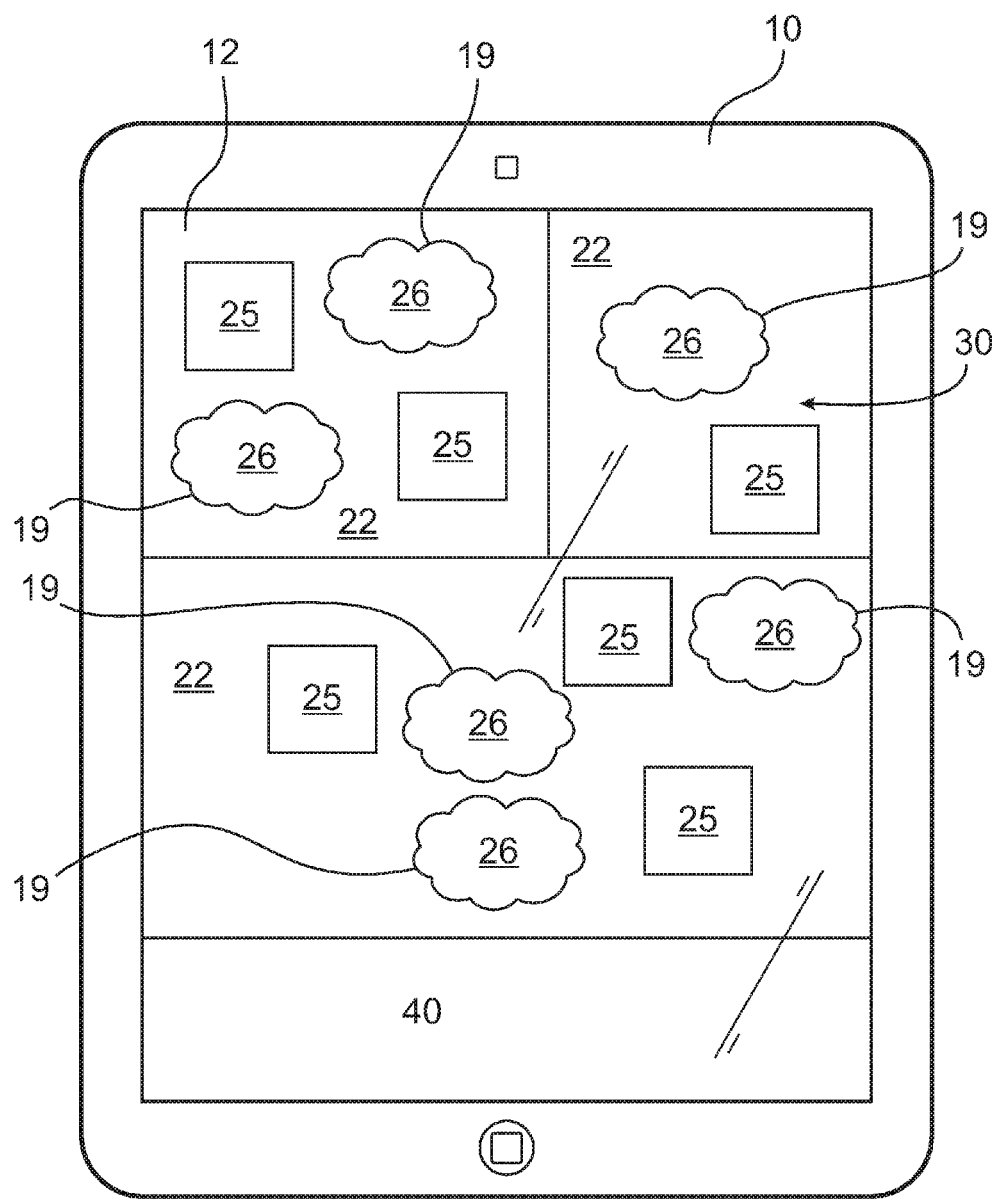
FIG. 3 is a graphical representation of a language display module and a language learning module of the language learning system according to the invention showing a general user interface having a plurality of sequential juxtaposed panels.

With reference to FIG. 3, the language learning file 20 will be described by way of illustration of the general user interface 12 for the computing device 10.

The language learning file 20 includes a sequence of instructions, which is written to perform a specified tasks to display, and generally includes a language display module 30 and a language learning module 40. The language learning file 20 further includes multilingual data 24, including graphical constant elements 25, dynamic lexical elements 26, and auditory elements 27. In particular, the language display module 30 displays graphical constant elements 25 and dynamic lexical elements 26 through the general user interface 12, while the language learning module 40 switches a display of the dynamic lexical elements 26 between native language data and secondary language data that is a translation of the native language data. The language learning module 40 also performs auditory function by broadcasting auditory elements 27 corresponding to the native language data and secondary language data.

Figure 4:
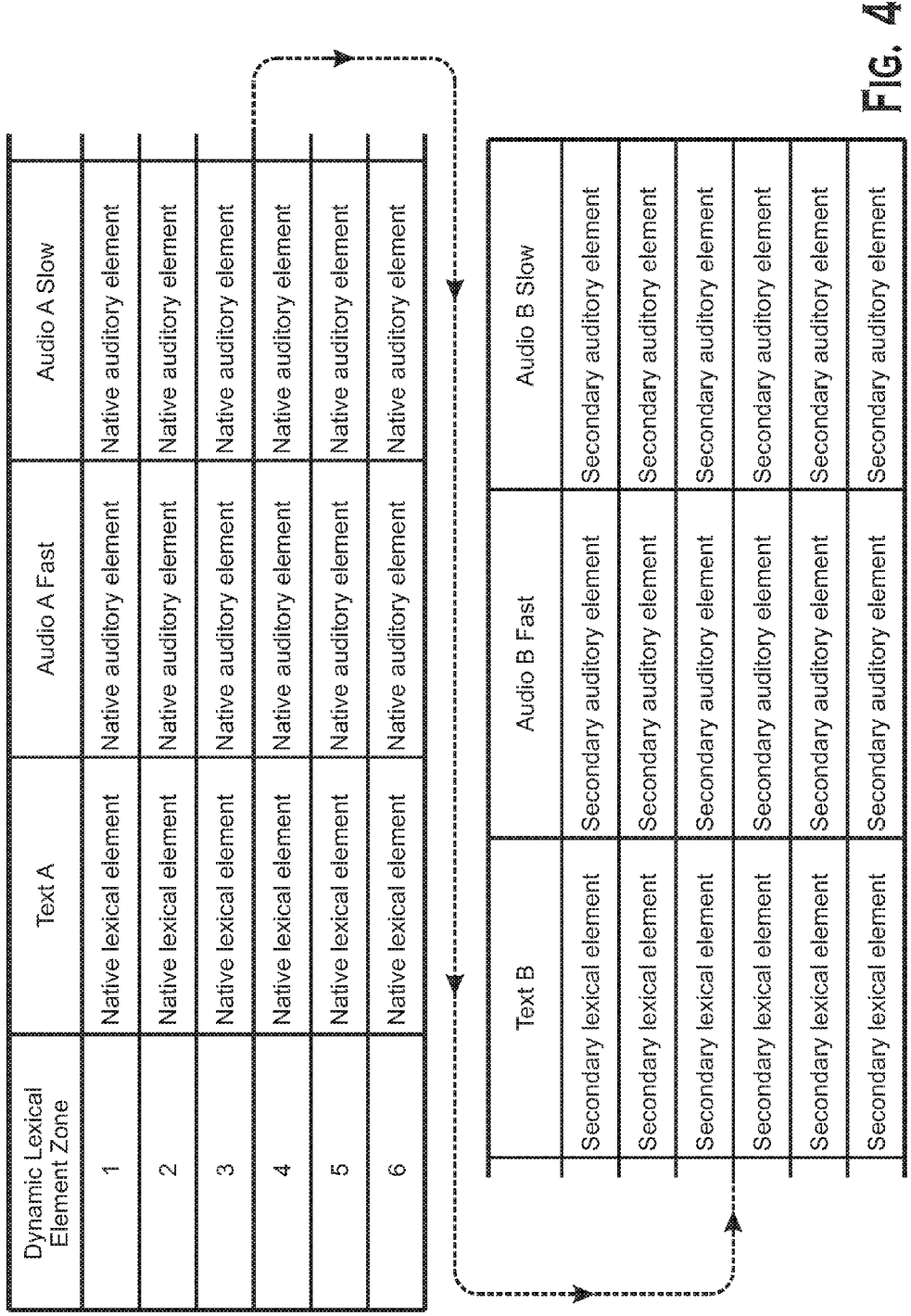
FIG. 4 is a graphical representation of a relational database for the language learning system according to the invention.
Figure 5:
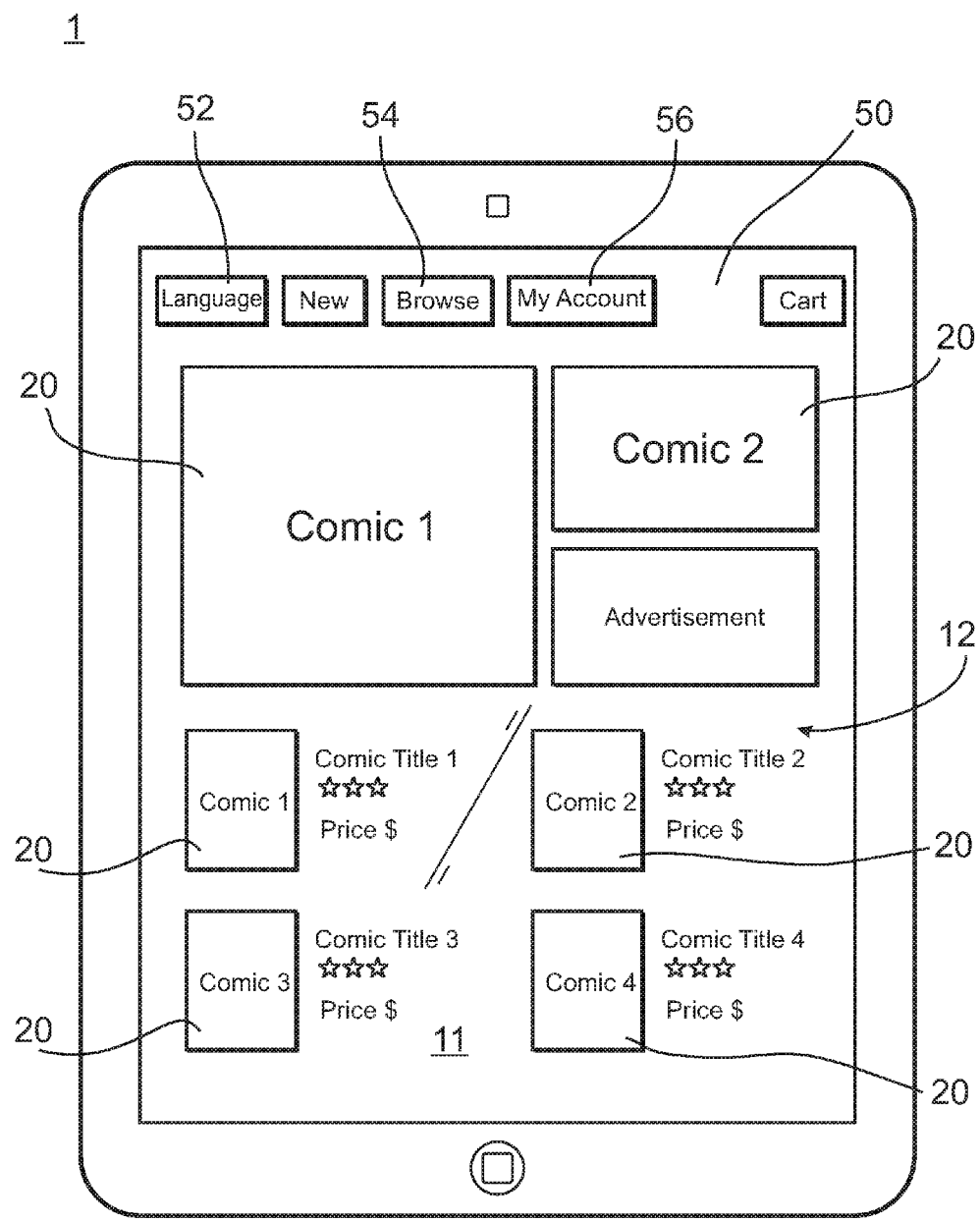
FIG. 5 is a graphical representation of a learning language management application of the language learning module according to the invention.
Figure 6:
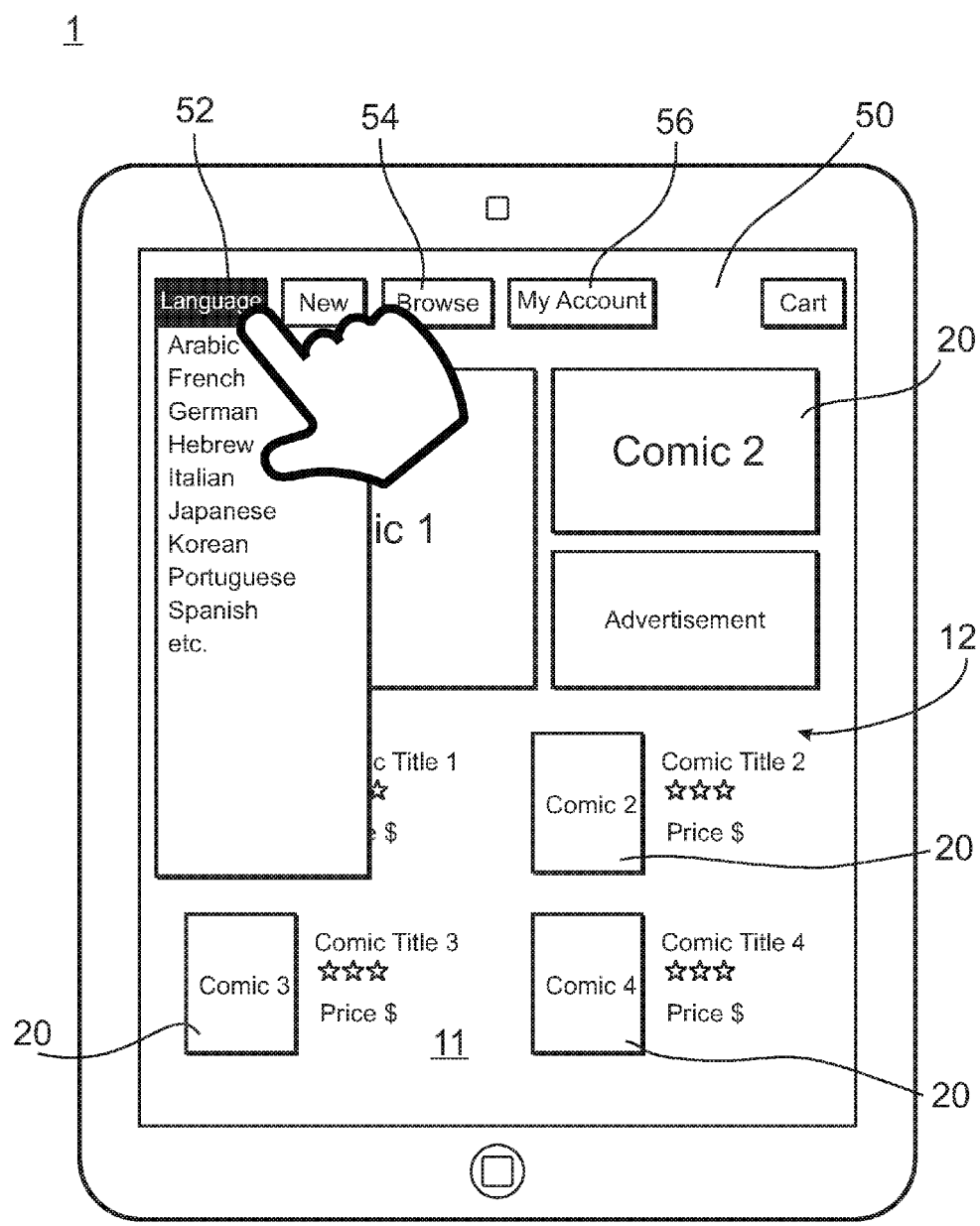
FIG. 6 is a graphical representation of a language listing module of the learning language management application of FIG. 5.
Figure 7:
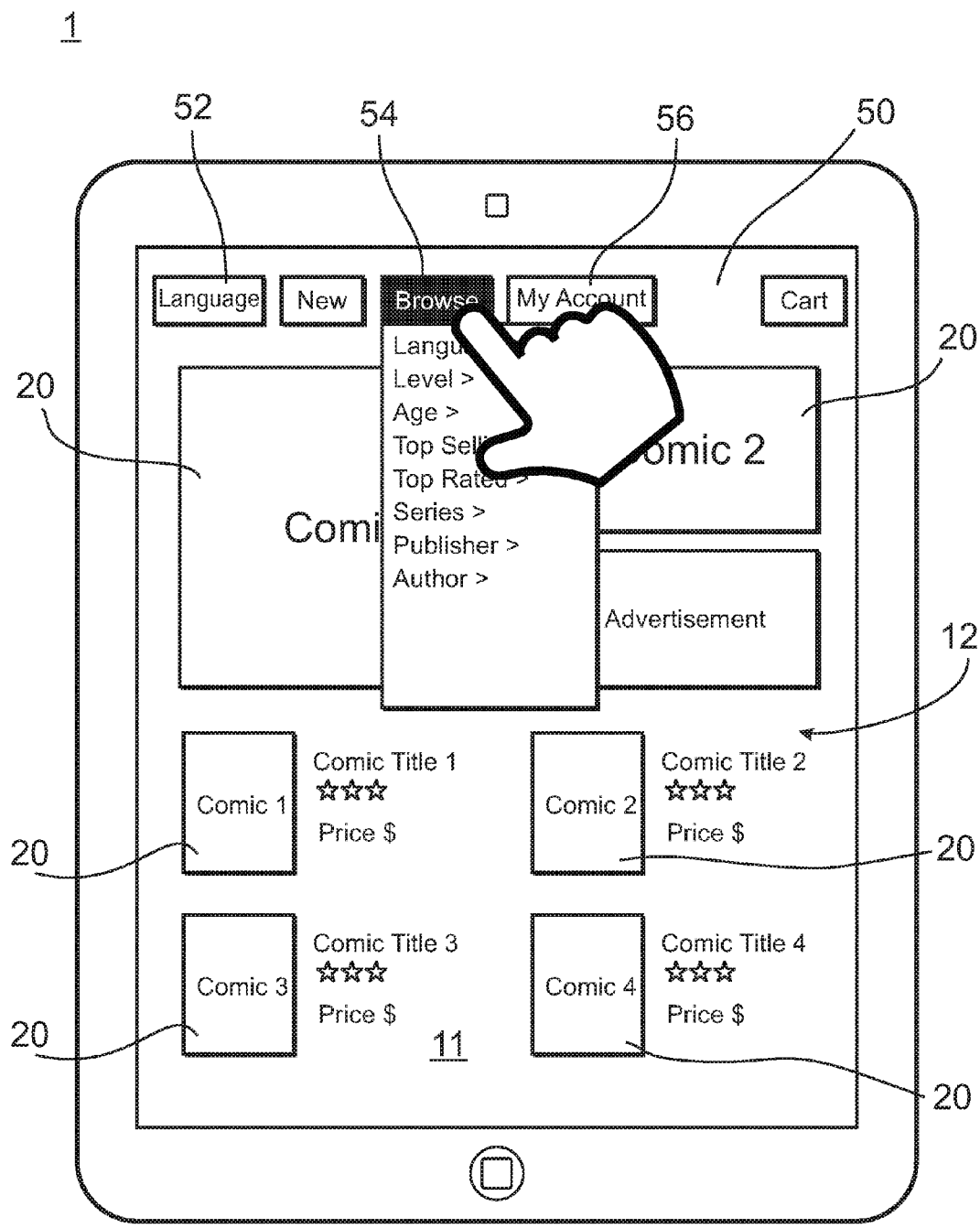
FIG. 7 is a graphical representation of a file browse module of the learning language management application of FIG. 5.
Figure 8:
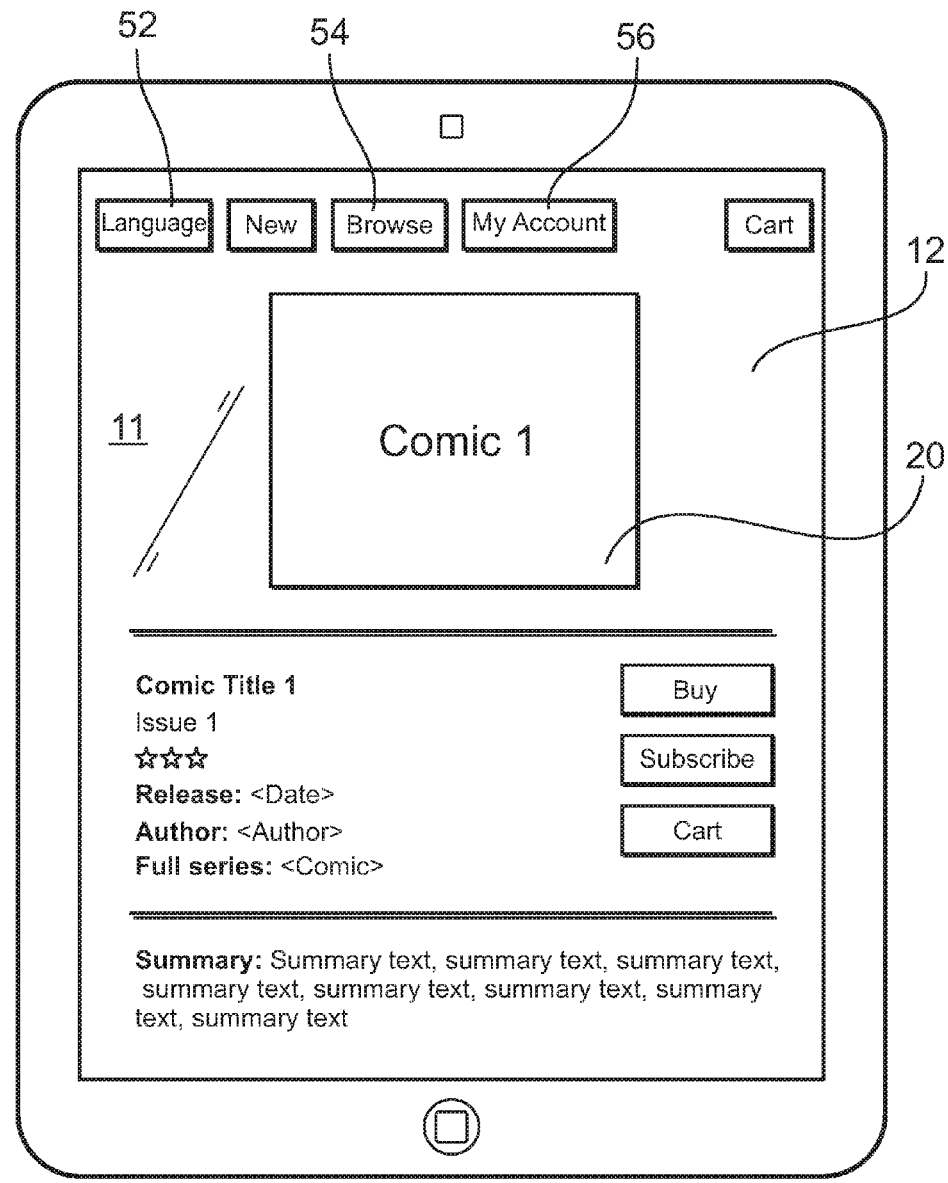
FIG. 8 is another graphical representation of the learning language management application of FIG. 5.
Figure 9:
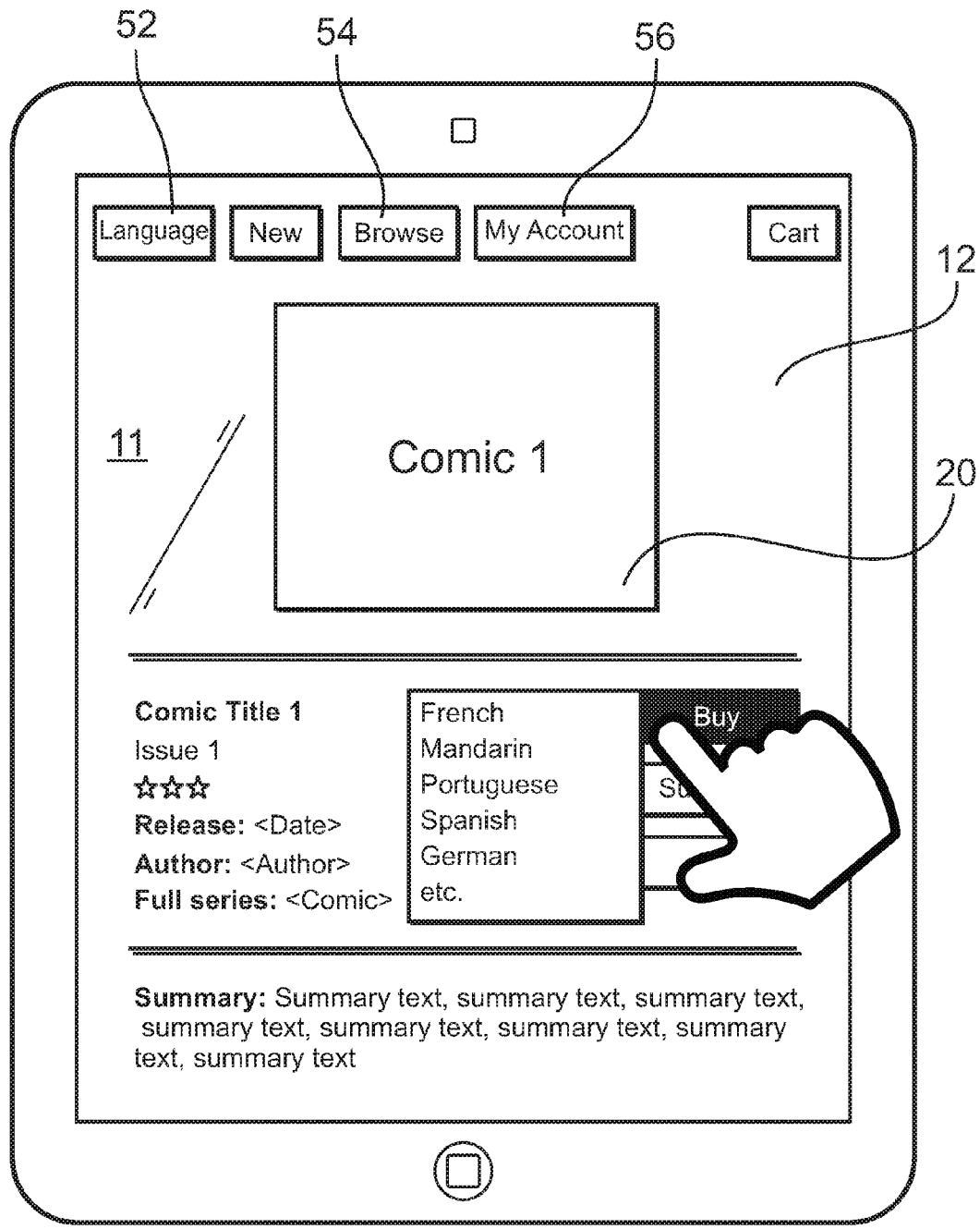
FIG. 9 is another graphical representation of the learning language management of FIG. 5.
Figure 10:
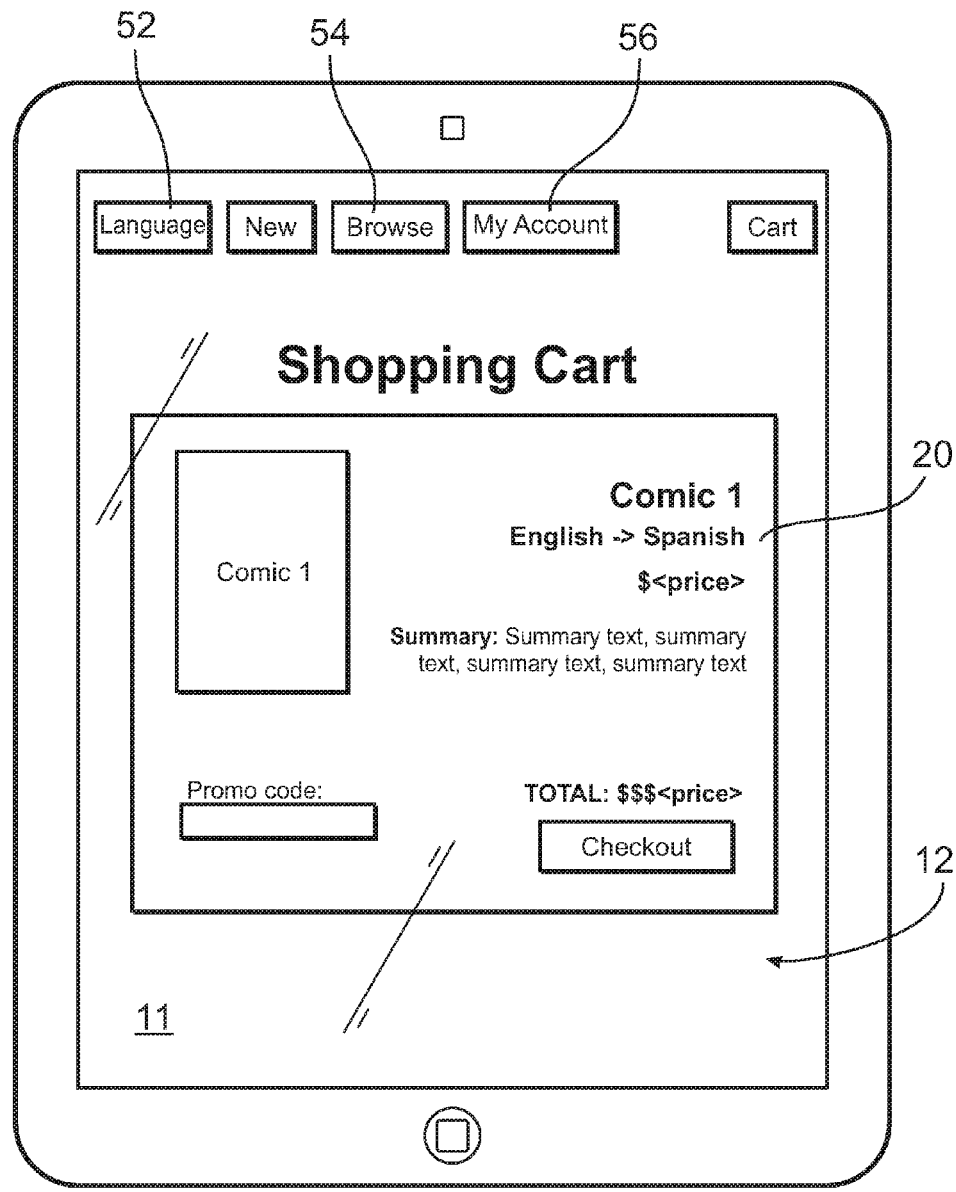
FIG. 10 is another graphical representation of the learning language management of FIG. 5
Figure 11:
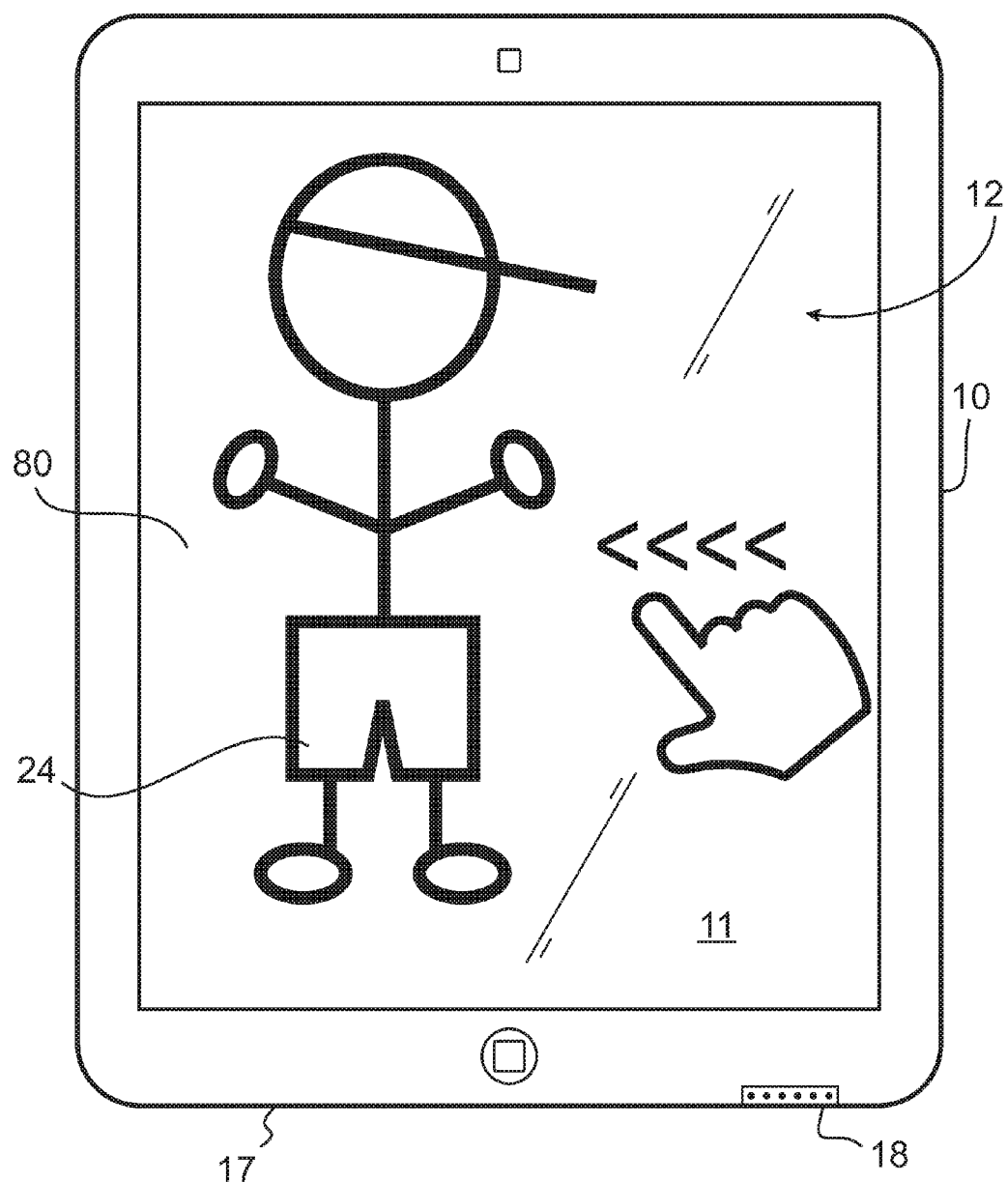
FIG. 11 is a graphical representation of the language learning system according to the invention showing a general user interface displaying data from a language learning file.
Figure 12:
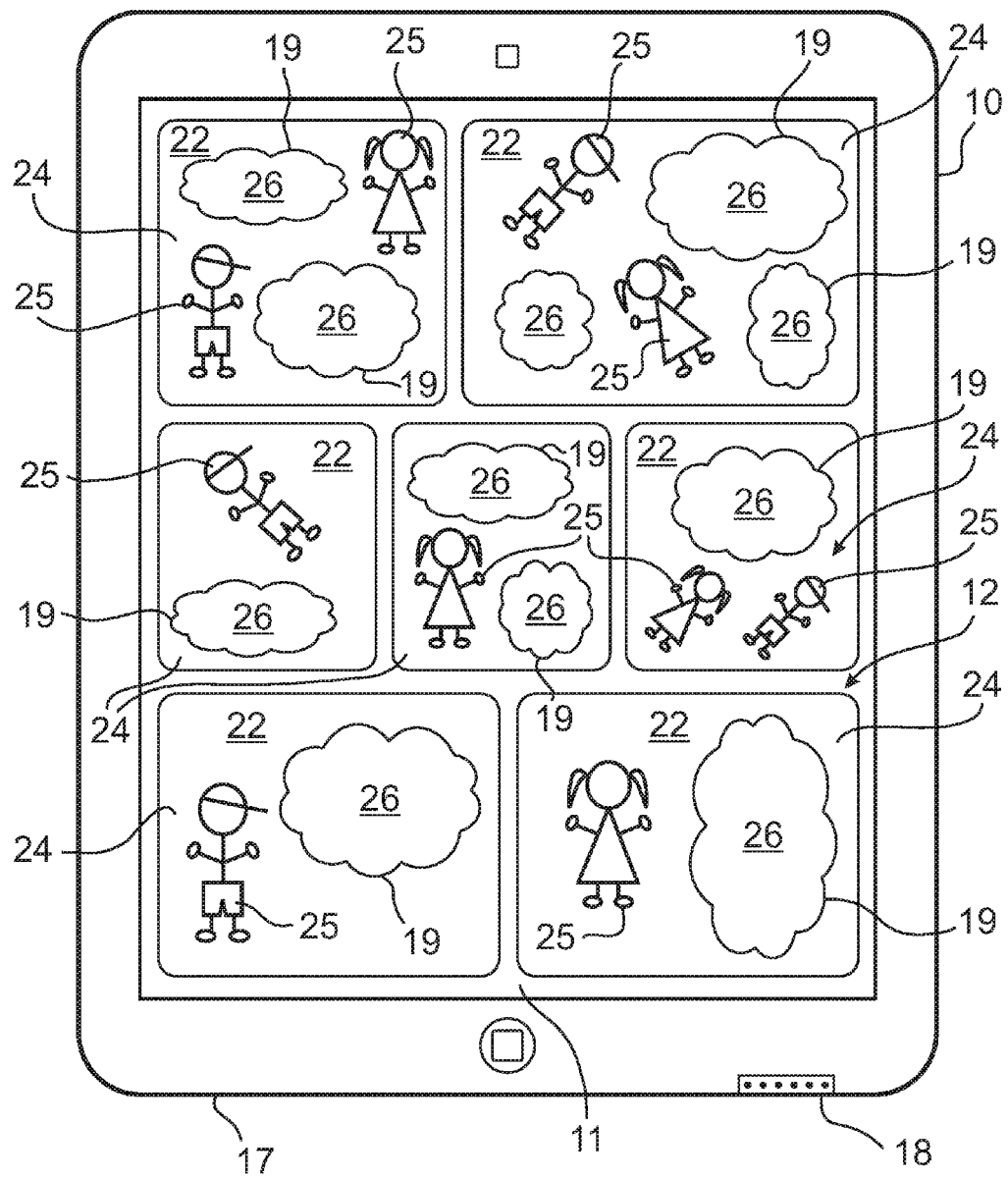
FIG. 12 is a graphical representation of a language display module and a language learning module of the language learning system according to the invention showing a general user interface having a plurality of sequential juxtaposed panels.
Figure 13:
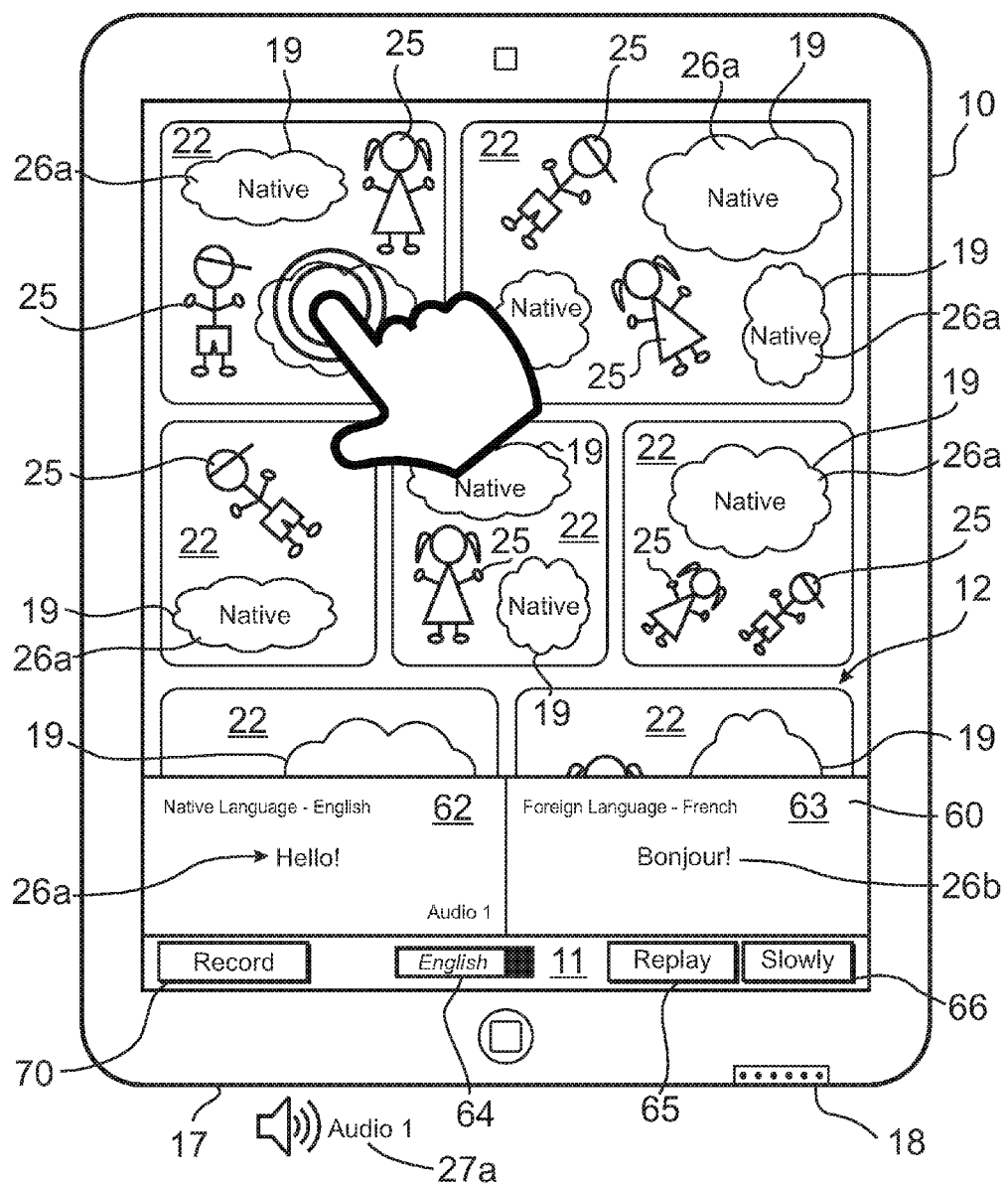
FIG. 13 is a graphical representation of the language display module and the language learning module of FIG. 12 showing a native language display section.
Figure 14:
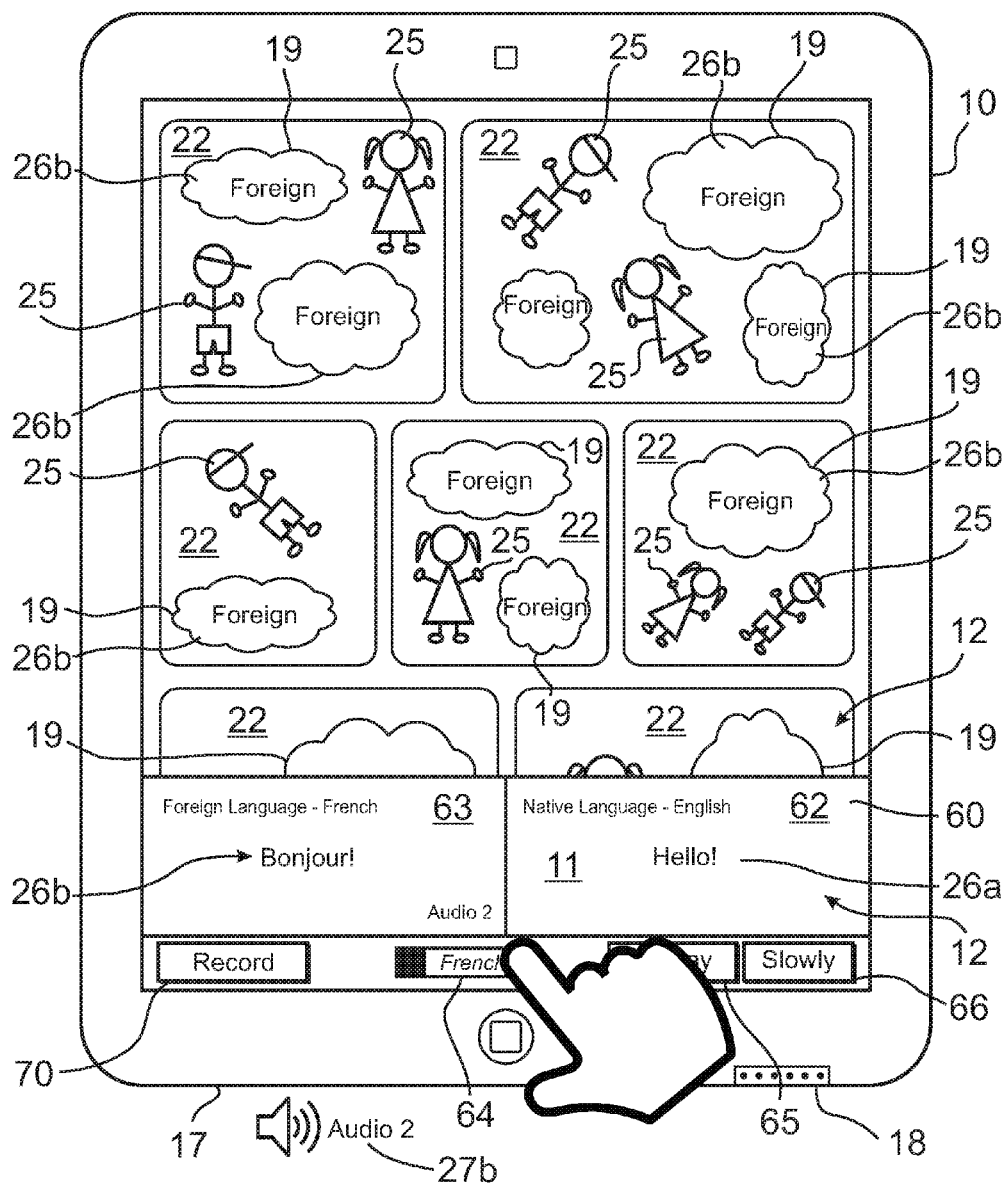
FIG. 14 is another graphical representation of the language display module and the language learning module of FIG. 12 showing a secondary language display section.
Figure 15:
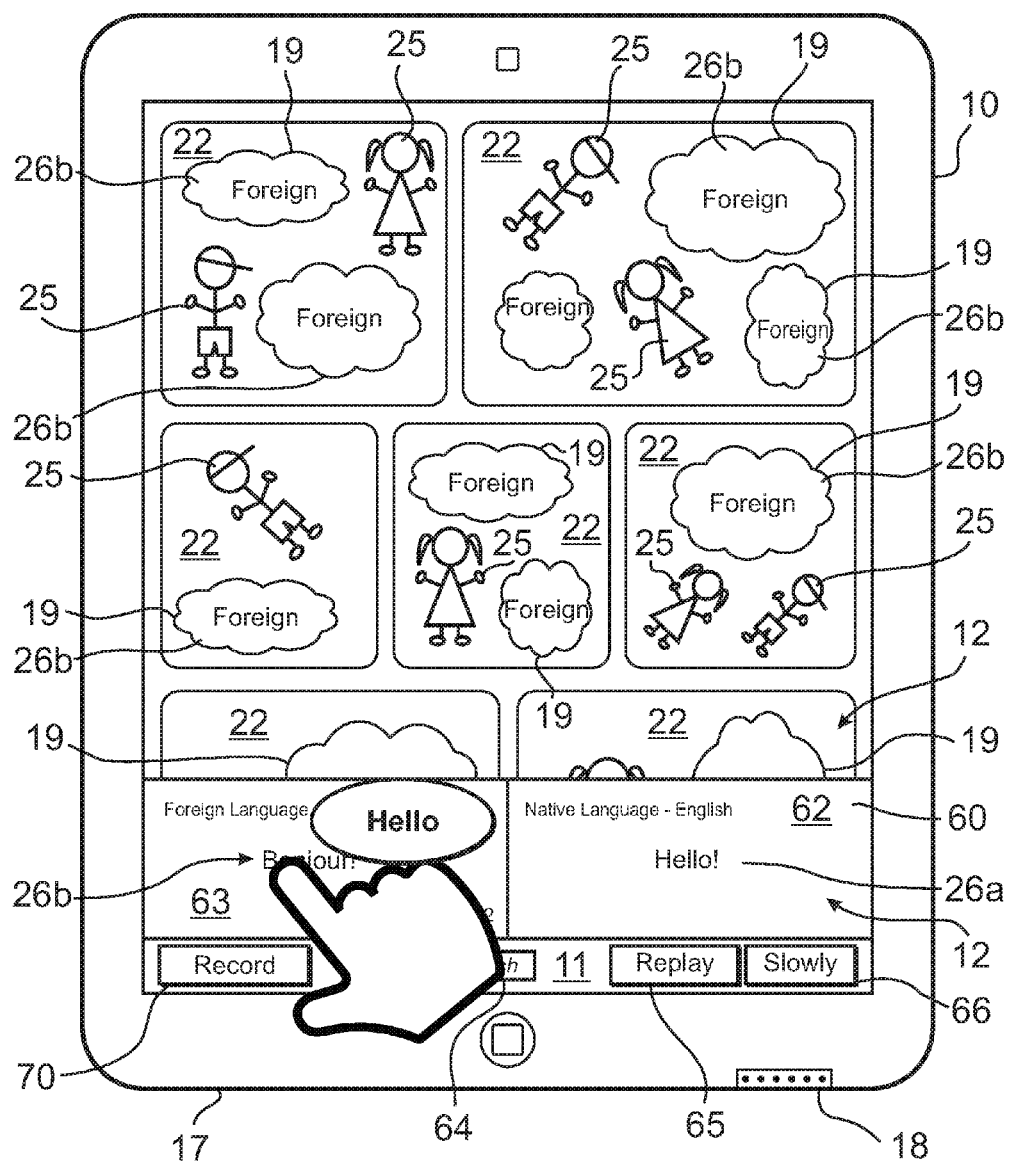
FIG. 15 is another graphical representation of the language display module and the language learning module of FIG. 14 showing a translation window.
Figure 16:
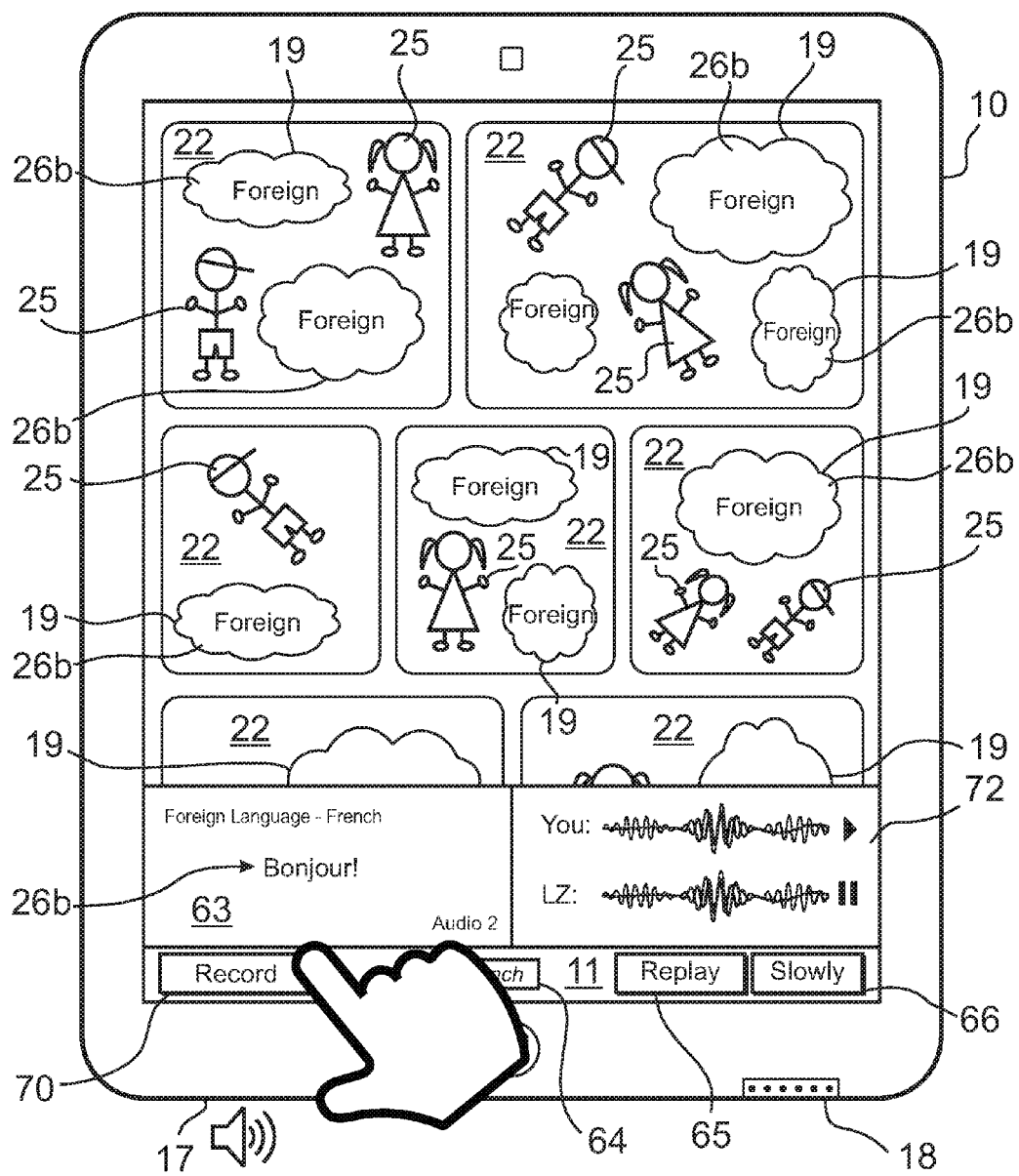
FIG. 16 is another graphical representation of the language display module and the language learning module of FIG. 14 showing an audio wave-form analysis module.

As shown in FIG. 4, the multilingual data 24, including native language data and secondary language data, is stored in relational databases. These relational databases include data elements listed in related tables that match up to links that are identified as zones 19 in FIG. 3. These zones 19 correspond to coordinates along the general user interface 12. As shown in FIG. 3, an example of how the multilingual data 24 associated with each zone 19 could be stored in a database, using the index key to identify which zone's data is utilized by the language learning module 40, and the various other elements associated with the index key can be called up to either fill the text zone with text in the desired language, or cause the device to play an audio recording of the text being spoken as will be described later.

Now with reference to FIGS. 17-26, a gesture selection module 80 for the language learning system 1 will be described. For the sake of brevity, only those features that differ from the language learning system 1 discussed above will be described, while like components will be omitted from discussion.

In general, the gesture selection module 80 provides a system and method for user to select one or more distinct objects, such as the dynamic lexical elements 26, displayed in the zones 19 by means of a circular gesture. The gesture selection module 80 selects the one or more distinct objects, for instance, and stores that content in a user personal file or account for subsequent review. In the shown embodiment, the user selects one or more dynamic lexical elements 26 from the general user interface 12 of the computing device 10, and the gesture selection module 80 stores information concerning the dynamic lexical elements 26 in a user personal account using the account module 56 of the learning language management application 50. However, one skilled in the art should appreciate that the gesture selection module 80, discussed in more detail below, could be used with other systems requiring a user to select and store information displayed on a general user interface 12.

Figure 17:
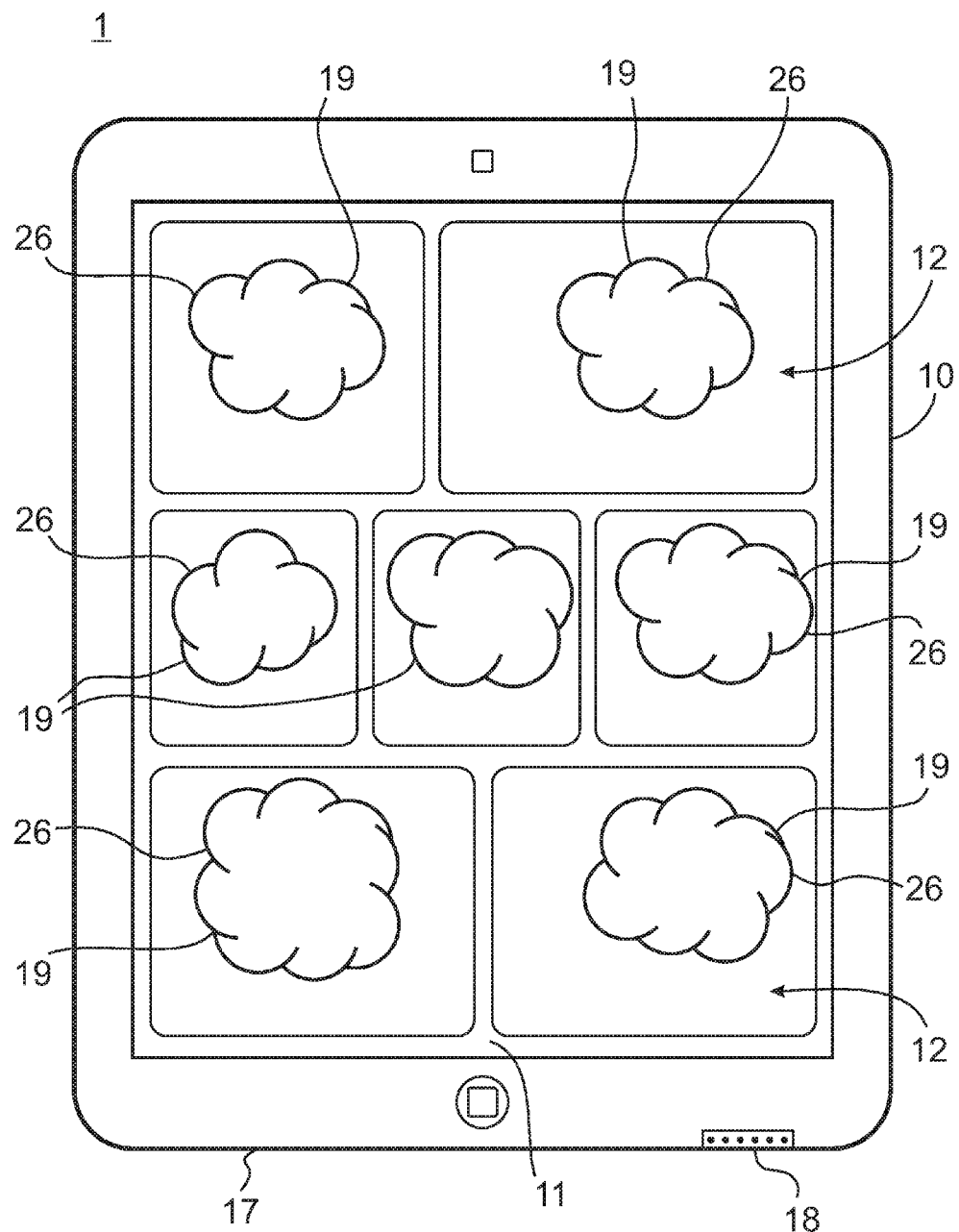
FIG. 17 is a graphical representation of a gesture selection module for the language learning system according to the invention.

With reference to FIG. 17, the gesture selection module 80 uses the computing device 10 with a touch screen 13 that provides an overlay on top of the touchscreen computing devices' operating systems' standard input and output processing techniques. The overlay on top of the input and output system identify specific areas on the screen as selectable elements, i.e. dynamic lexical elements 26, and is designed to detect and process a gesture which is recognized as an arc that would contain the elements the user desires to select.

Figure 18:
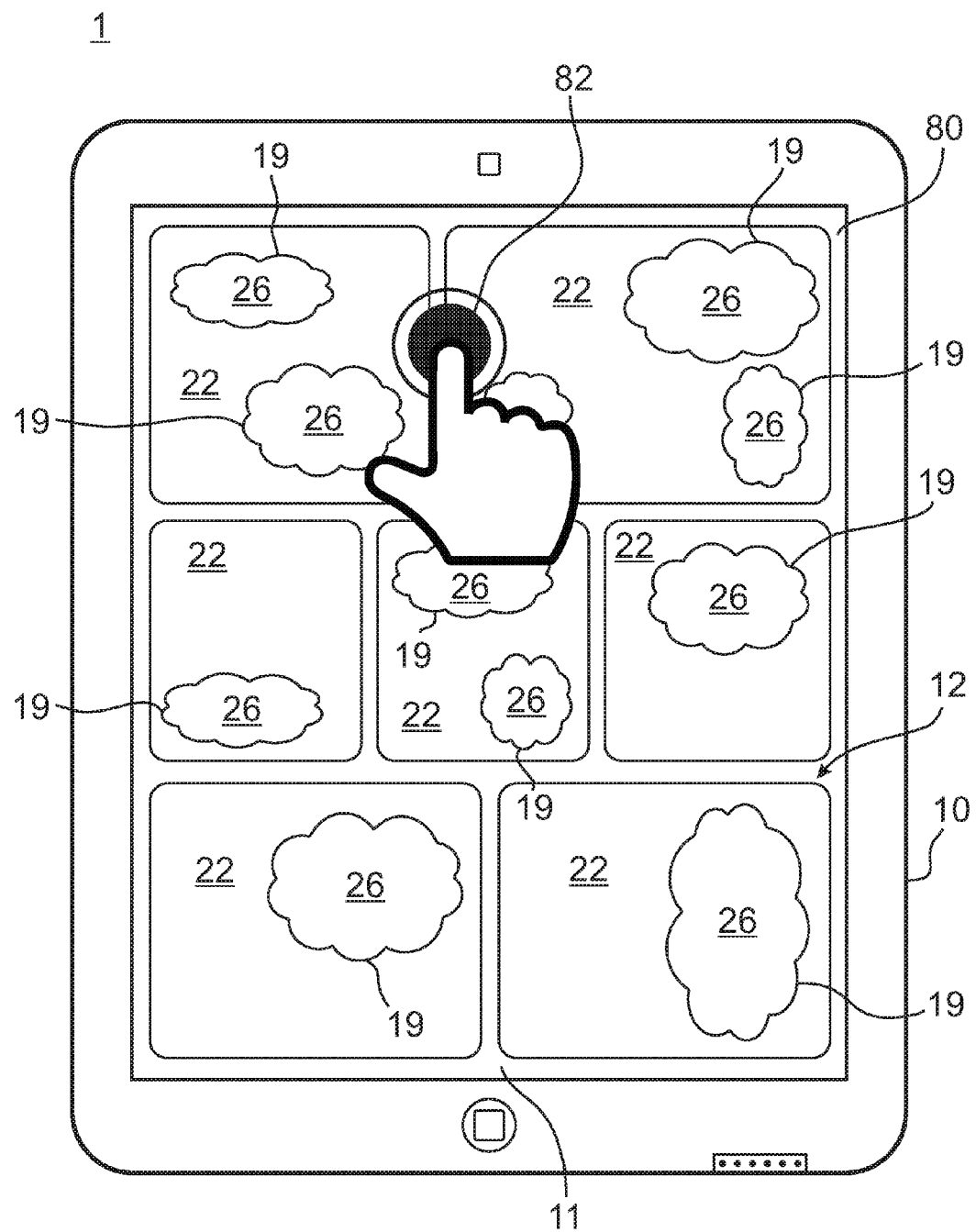
FIG. 18 is another graphical representation of the gesture selection module of FIG. 17, showing initiation of a gesture initiation location.

As further shown in FIG. 18, the user initiates the gesture selection module 80 by touching the general user interface 12. The gesture initiation location 82 of the initial touch is stored in memory device 15 and corresponds to a specific coordinate of a coordinate system of the general user interface 12.

Figure 19:
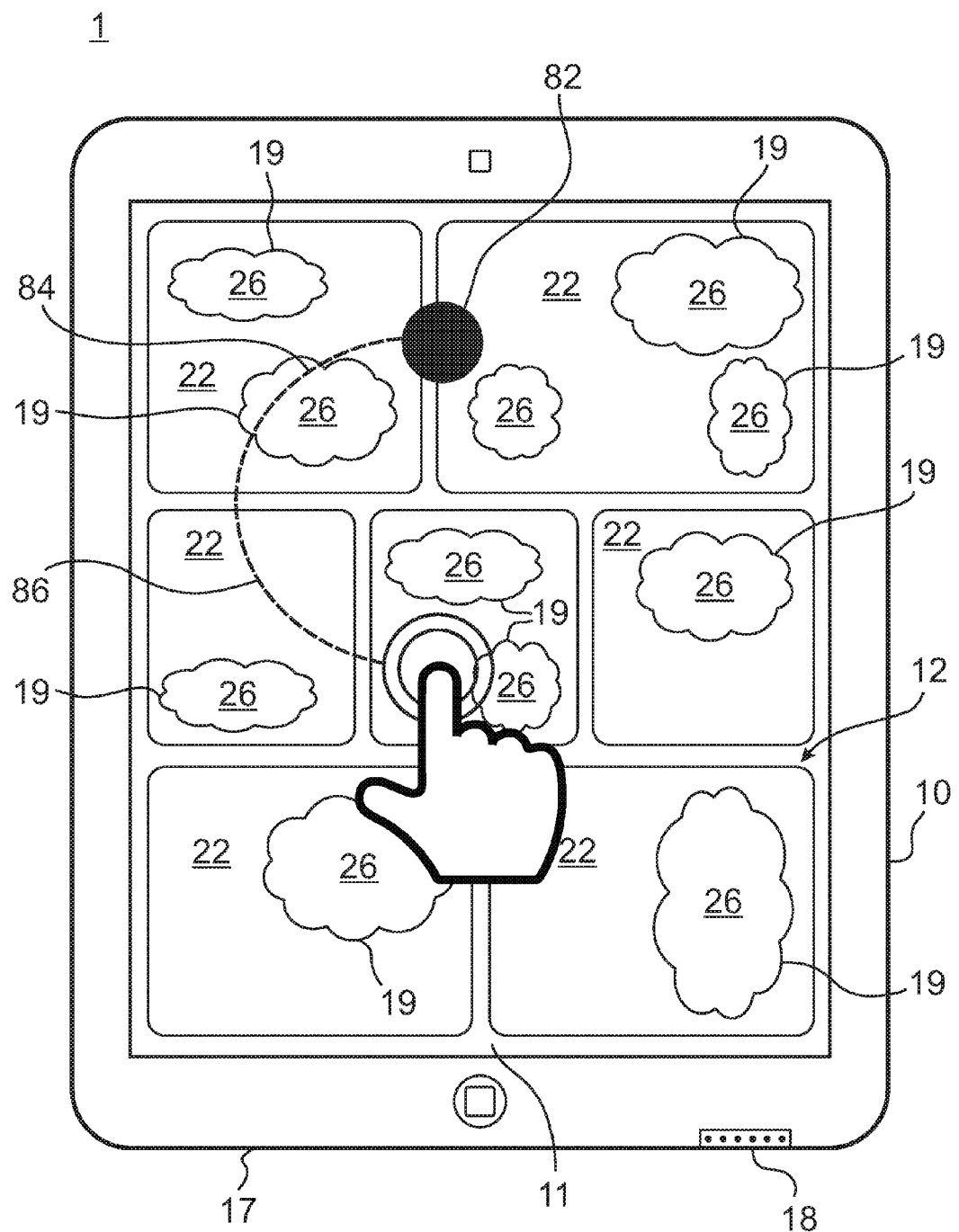
FIG. 19 is another graphical representation of the gesture selection module of FIG. 18, showing a path of a continuous arc.
Figure 20:
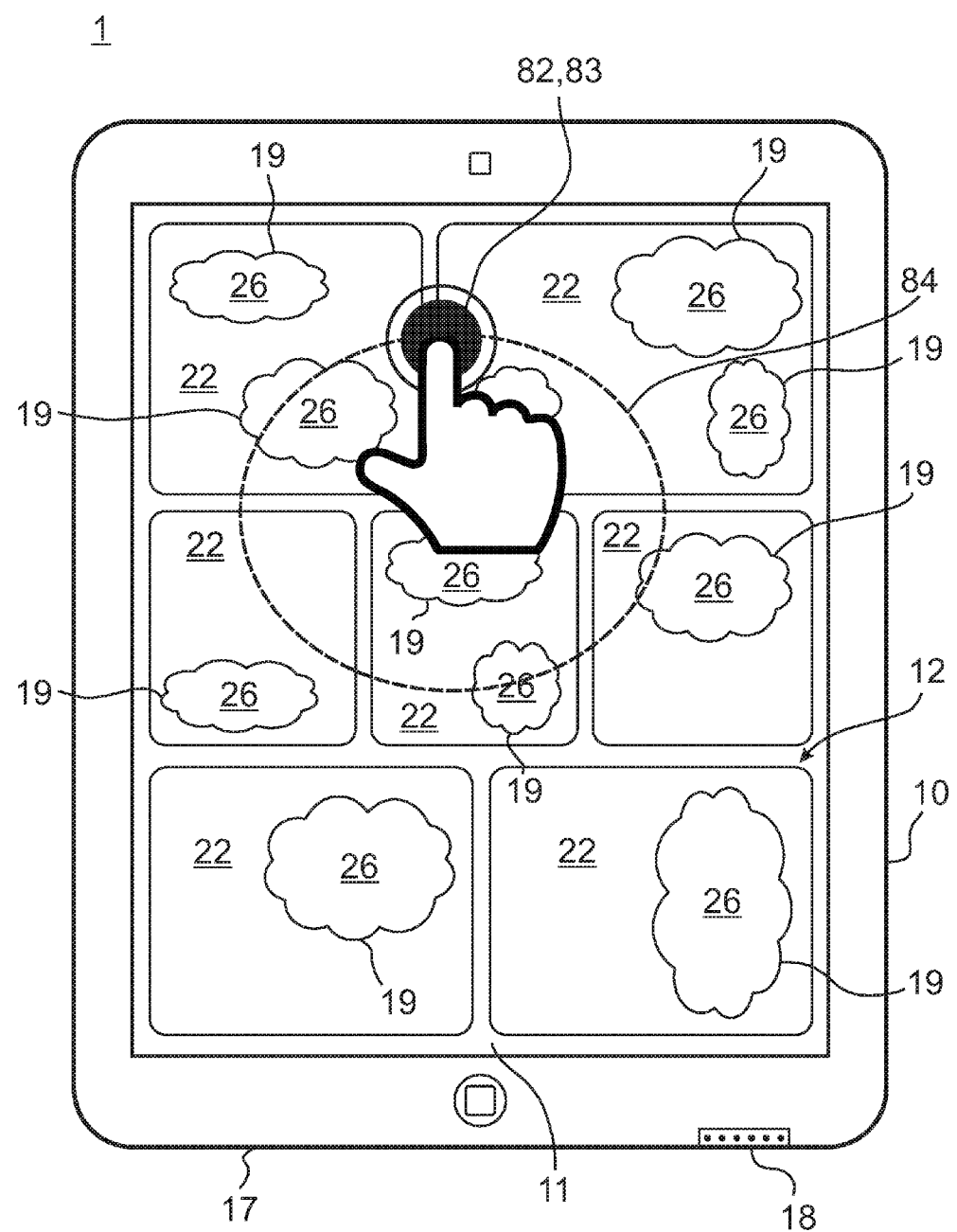
FIG. 20 is another graphical representation of the gesture selection module of FIG. 19, showing a completed path of the continuous arc.
Figure 21:
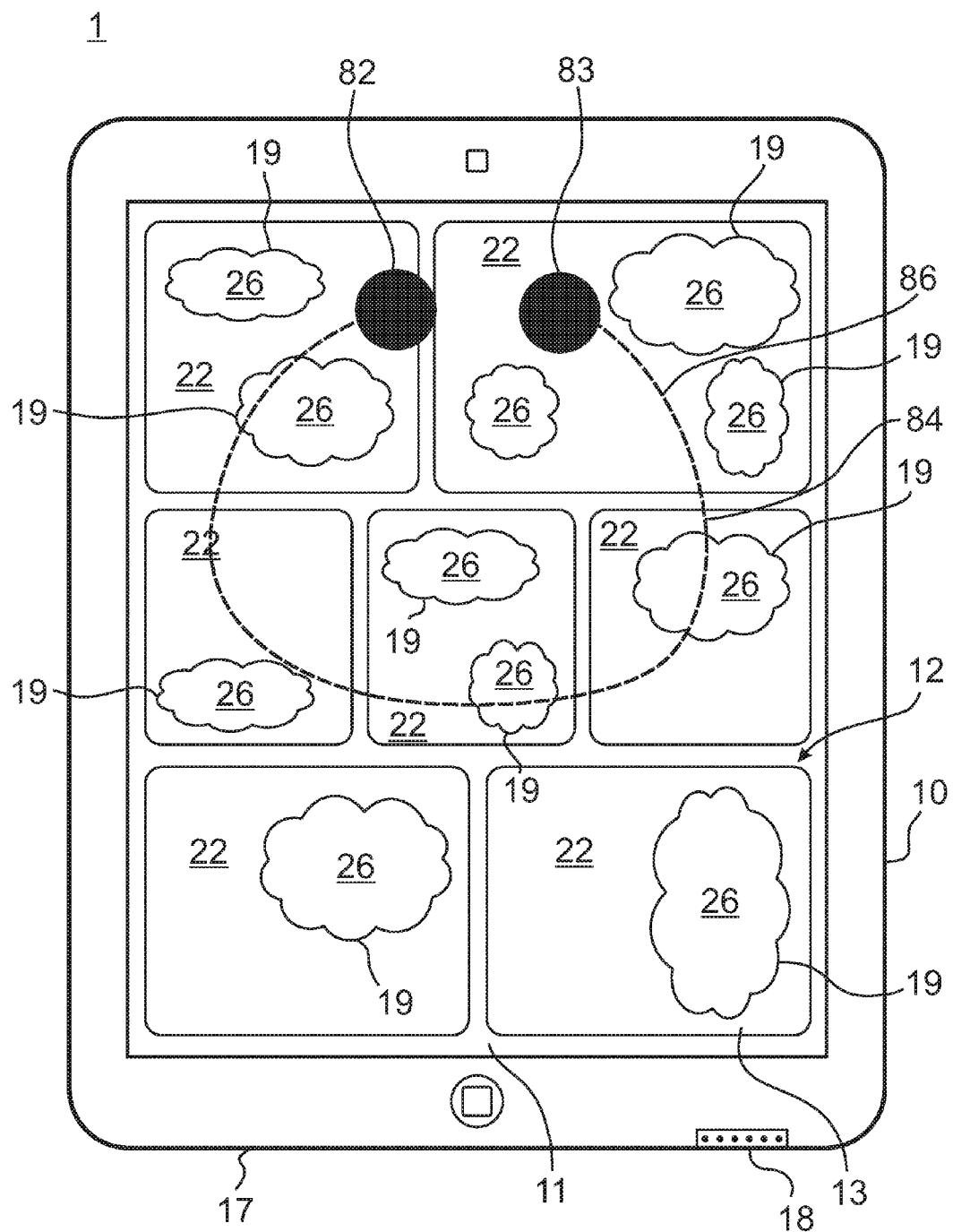
FIG. 21 is another graphical representation of the gesture selection module of FIG. 19, showing an incomplete path of the continuous arc.

As shown in FIG. 19, the user continues pressing the general user interface 12 in one continuous motion immediately following gesture initiation, by lifting the finger of the computing device 10 (e.g. touch up action), the gesture initiation location 82 is generated and stored by the gesture selection module 80. The user performs a gesture through a continuous arc 84 of constant or variable radius in the embodiment shown. However, once skilled in the art should appreciate that the gesture selection module 80 could require other geometrical paths, such as squares, rectangle, triangles, etc.

Before registering a conclusion action, by lifting the finger of the computing device 10 (e.g. touch up action), the coordinates of the continuous arc 84 are stored. If the arc path of the continuous arc 84 reaches an area within a predefined radius of the gesture initiation location 82 or the gesture selection module 80 recognizes when the user's fingers crosses the gesture path already generated the continuous arc 84 is considered completed (see FIG. 20).

It is not imperative for the gesture path of the continuous arc 84 create a closed geometric symbol (e.g. oval, circle, square, rectangle, etc.). In the case where the user lifts off of the computing device 10 (i.e. "touch up" action) before the gesture path of the continuous arc 84 is completed or crossed, the result is an open arc 86 (see FIG. 21). It is possible to evaluate the resulting arc of the open arc 86, the gesture selection module 80 uses an algorithm to determine if the user sufficiently provided an arc path that resembles the closed path of the continuous arc 84 required for the steps discussed in detail below.

Figure 22:
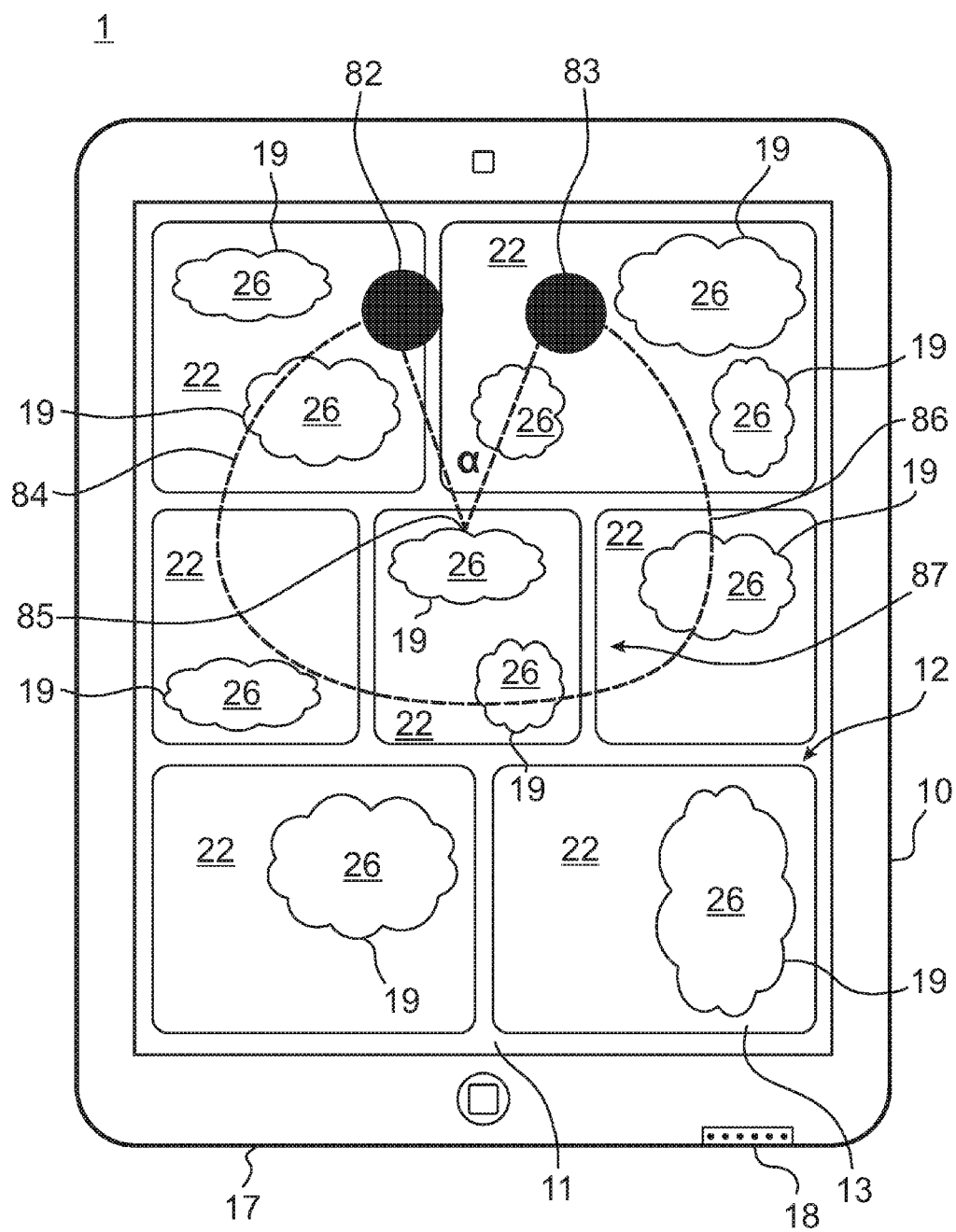
FIG. 22 is another graphical representation of the gesture selection module of FIG. 21, showing an apex of an inner arc area.
Figure 23:
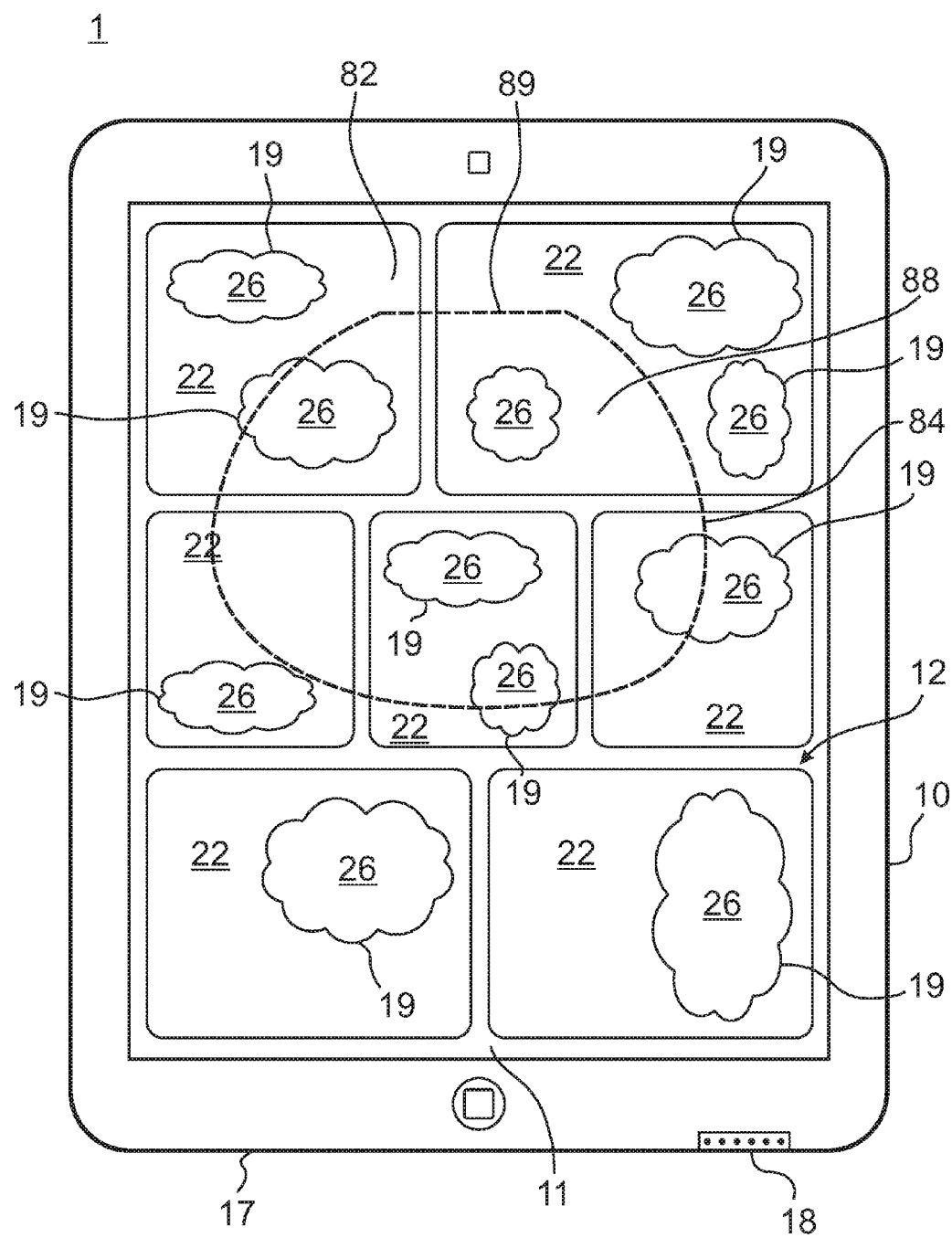
FIG. 23 is another graphical representation of the gesture selection module of FIG. 22, showing a connection line connecting the gesture initiation location and a gesture end location of the incomplete path.

As shown in FIG. 22, the gesture selection module 80 can evaluate the arc path of the continuous arc 84 by determining an angle (a) between the gesture initiation location 82 and a gesture end location 83 of the arc path of the continuous arc 84 and an apex 85 at the (approximate) center of an inner area area 87. For instance, if this angle ($\alpha$) is smaller than a pre-determined value (i.e. 15 degrees), the gesture selection module 80 will conclude the open arc 86 is completed.

Once the gesture selection module 80 concludes the arc path has been completed, as determined above, the gesture selection module 80 determines a selection area 88 enclosed by the gesture path and completed continuous arc 84. In the shown embodiment of FIG. 23, a closed oval is illustrated, and the selection area 88 area is defined as the internal area enclosed by the continuous arc 84. In the case of an open arc 86 that meets the predefined criteria for a completed gesture, the selection area 88 is defined as the internal area enclosed by the figure defined by the continuous arc 84 and a connection line 89 connecting the gesture initiation location 82 and a gesture end location 83. The gesture selection module 80 interpolates a path that will close the open arc 86 and define an enclosed subset of the selection area 88.

Figure 24:
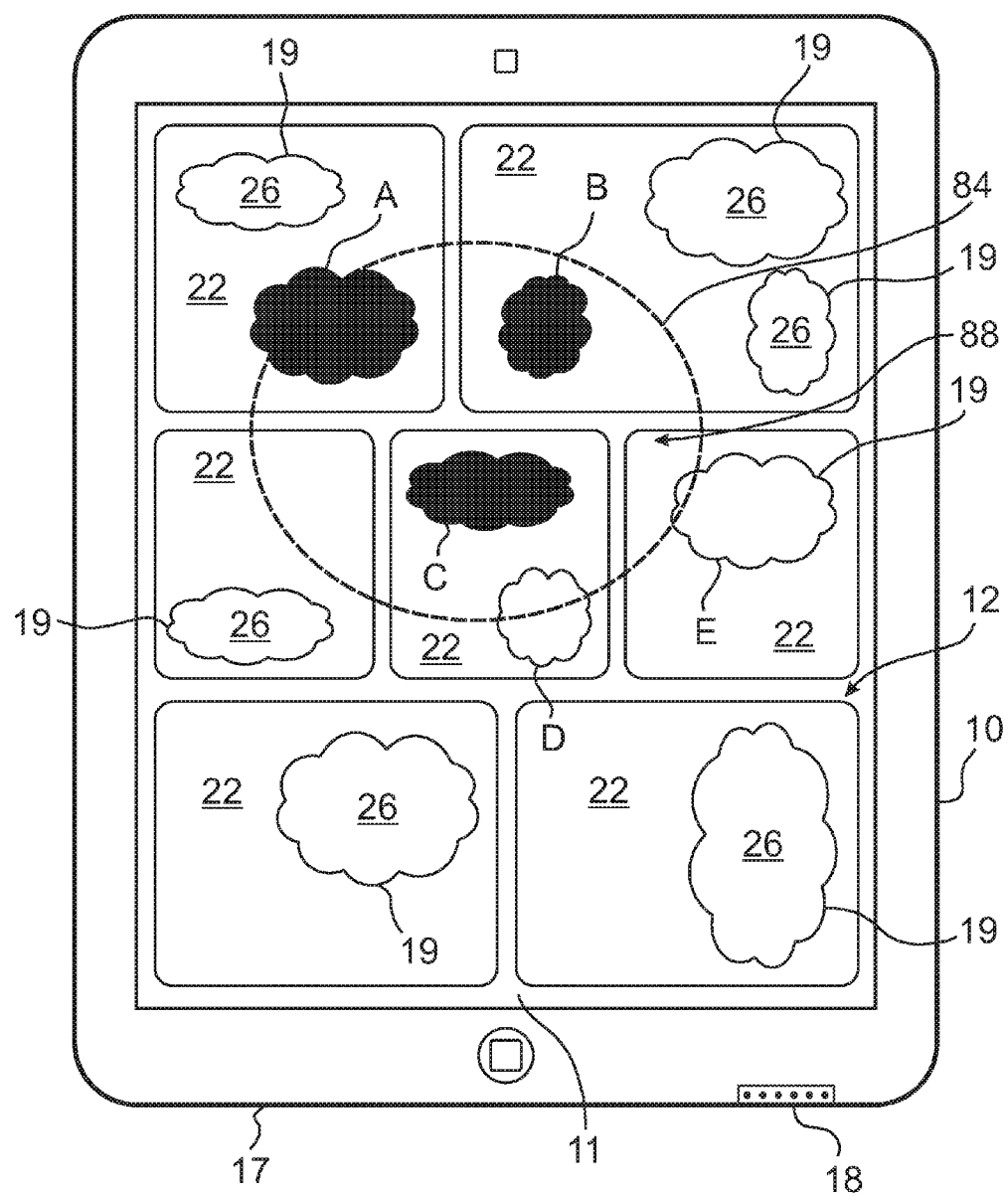
FIG. 24 is another graphical representation of the gesture selection module of FIG. 20, showing objects of interest with a selection area of the completed continuous arc.

As shown in FIG. 24, the gesture selection module 80 then determines any objects of interest, including one or more dynamic lexical elements 26, within the selection area 88.

Once the selection area 88 is determined, the gesture selection module 80 uses an element capture algorithm that can be used for determining the eligibility of each object of interest for inclusion into a selected subset (based on selection area, stored as coordinates, etc.).

For instance, the gesture selection module 80 can use a center coordinates method to determine the eligibility of each object of interest. Using the center coordinates method, the gesture selection module 80 evaluates metadata for each object of interest, i.e. one or more dynamic lexical elements 26, to determine whether the center of the object is within the enclosed area. If the center of the object, such as a center of the zone 19, is found to be within the selection area 88, the object is included in the subset stored in the memory device 15.

As shown in FIG. 24, the selection area 88 is defined by a completed continuous arc 84. Objects B and C are fully overlapped by the selection area 88, as a result they are included in the selection subset stored in the memory device 15. Since, object A is partially overlapped by the selection area with its center being inside the selection area 88, the gesture selection module 80 includes object 1 in the selection subset stored in the memory. Objects D and E are partially overlapped by the selection area with their centers outside the selection area 88, and as a result they are not included in the selection subset stored in the memory. Since all other objects are outside of the selection area 88, the gesture selection module 80 does not include them in the selection subset.

Figure 25:
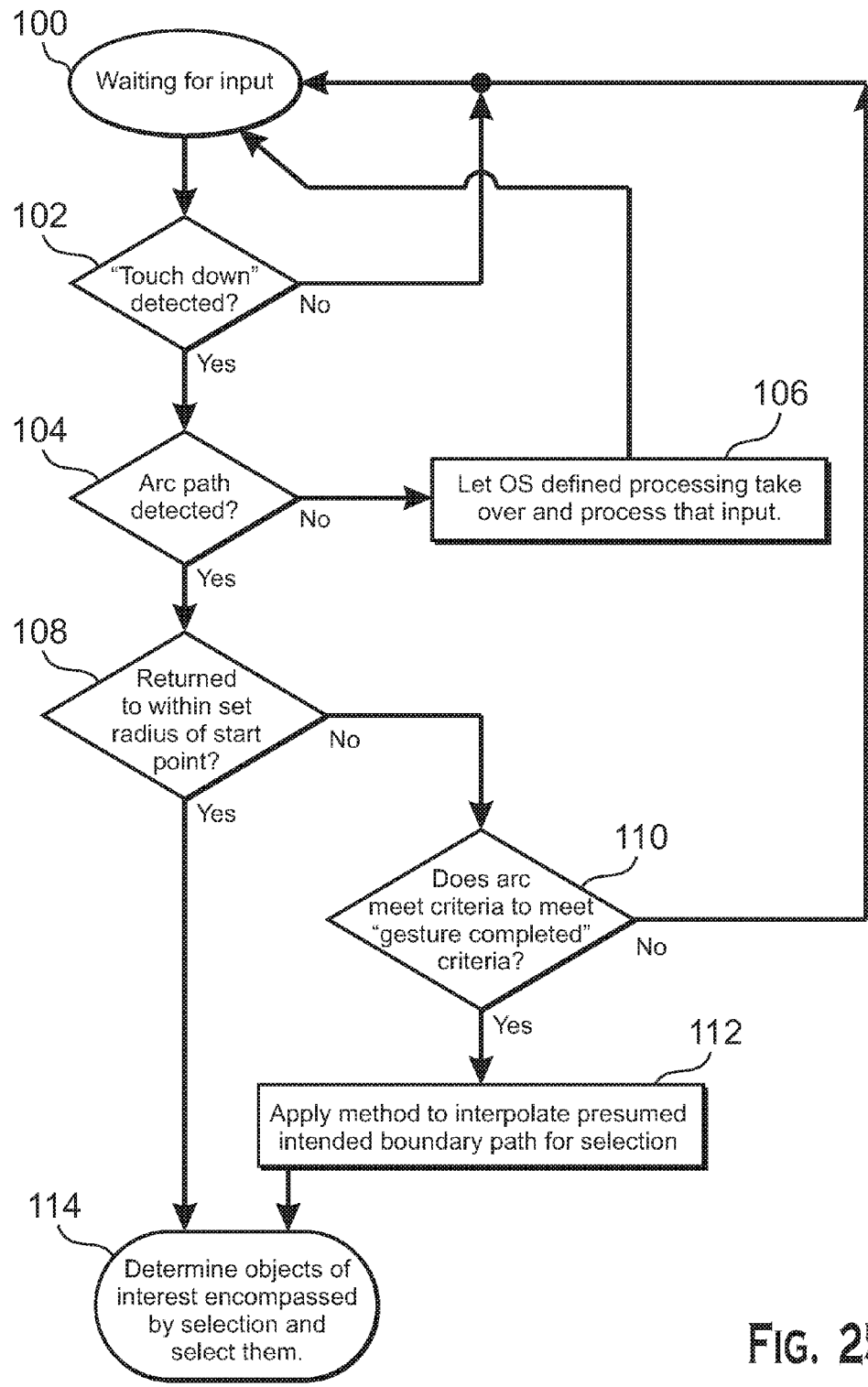
FIG. 25 is schematic flow chart of a method of gesture selection using the gesture selection module according to the invention.

FIG. 25 illustrates the general steps performed by the gesture selection module 80. In step 100, the gesture selection module 80 waits for the user to provide gesture initiation location 82. Once the user pushes down in the general user interface 12, the gesture initiation location 82 detects a "touch down" at step 102, as defined above. At step 104, the gesture selection module 80 determines is a continuous arc 84 has been started. If not, at step 106, the gesture selection module 80 allows the computing device operating system to take over and process movement on the touchscreen 13. At step 108, if a continuous arc 84 is determined, the gesture selection module 80 determines if the continuous arc 84 has been completed by connecting the gesture initiation location 82 and a gesture end location 83. If the user does not complete the continuous arc 84, the gesture selection module 80 applies a method to interpolate presumed intended boundaries of continuous arc 84, as completed. If not, the computing device operating system to take over and process movement on the touchscreen 13 by step 106. However, if the gesture selection module 80 does determine a selection are, objects of interest, such as dynamic lexical elements 26, encompassed in the selection area are selected and stored memory device 15, which can then be transferred to a user personal file or account.

The language learning system 1 according to the invention makes use of the multimedia capabilities of computers and mobile devices, and leverages the communicative capability of a publication, such as a graphic novel/comic book format to provide a variety of contextual elements (e.g. locale, character, storyline), while the computational power of the device allows instructional elements to be stored and presented in multiple languages, both in textual format and in recorded audio. The language learning system 1 will absorb the content of the pictorial context, and then can utilize the touchscreen interface to initiate the translations, cause the lexical elements to change from one language to another, i.e. a native language to a secondary language, as well as initiate the playing of the pre-recorded proper pronunciation of lexical elements. The language learning system 1 allows the user to record his/her own pronunciation of the words and compare it to the pre-recorded proper pronunciation via auditory elements. The embedded translations are not automatically generated in real-time, but instead have been written (in the case of textual translations) and recorded (in the case of audio translations) previously by a professional staff and stored in a language learning file. Consequently, the translations of lexical elements reflect proper grammar and pronunciation.

The foregoing illustrates some of the possibilities for practicing the invention. Many other embodiments are possible within the scope and spirit of the invention. Therefore, more or less of the aforementioned components can be used to conform to that particular purpose. It is, therefore, intended that the foregoing description be regarded as illustrative rather than limiting, and that the scope of the invention is given by the appended claims together with their full range of equivalents.

What is claimed is:

1. A method of gesture selection of displayed content, comprising the steps of:
   providing a computing device having:
      (a) a frame extending around a rectangular periphery of the computing device,
         (1) a touch screen display positioned in the frame for use with a finger or a stylus, and
      (b) an audio input device, the audio input device is a microphone positioned along an edge of the frame to receive an audio input signal, and
      (c) an audio output device, the audio output device is mounted along a periphery of the frame at a distance from the audio input device, and
         (1) a general user interface, and
         (2) a central processing unit for receiving the audio input signal and for transmitting an output signal through the audio output device;
   providing a language learning file unit run by the central processing unit and having:
      (a) a multilingual data storage containing multilingual data having:
         (1) a plurality of graphical constant elements,
         (2) a plurality of dynamic lexical elements corresponding to the graphical constant elements;
   providing an overlay on the touch screen display to identify specific areas where dynamic lexical elements are positioned;
   making a gesture initiation on the touch screen display with a finger or a stylus,
   determining a gesture initiation location when a user pushes down on the touch screen display;
   determining a continuous arc by movement of the user across the touch screen display;
   determining a completed continuous arc of the continuous arc by connecting the gesture initiation location with a gesture end location when the user lifts off of the touch screen display;
   determining a selection area based on an inner area of the completed continuous arc;
   using an element capture algorithm to determine what dynamic lexical elements are encompassed in the selection area;
   providing an account module with database connected to the computing device and capable of storing personal data in a personal account; and
   storing data associated with the dynamic lexical elements in the personal account.

2. The method of gesture selection according to claim 1, further comprising the step of:
   interpolating a presumed intended boundary of the continuous arc by preparing a connection line connecting the gesture initiation location and the gesture end location.

3. The method of gesture selection according to claim 2, wherein the continuous arc is a geometric shape.

4. The method of gesture selection according to claim 3, wherein the geometric shape is an oval.

5. The method of gesture selection according to claim 2, further comprising the step of:
   determining an angle (a) between the gesture initiation location and the gesture end location of an arc path of the continuous arc and an apex at the an approximate center of an inner arc area.

6. The method of gesture selection according to claim 5, further comprising the step of:
   evaluating metadata for each of the dynamic lexical elements encompassed in the selection area to determine whether a center of the dynamic lexical elements is within the selection area.

7. The method of gesture selection according to claim 1, wherein the continuous arc is a geometric shape.

8. The method of gesture selection according to claim 7, wherein the geometric shape is an oval.

9. The method of gesture selection according to claim 1, further comprising the step of:
   determining an angle (a) between the gesture initiation location and the gesture end location of an arc path of the continuous arc and an apex at an approximate center of an inner arc area.

10. The method of gesture selection according to claim 9, wherein the completed continuous arc is concluded when the angle ($\alpha$) is smaller than a pre-determined value.

11. The method of gesture selection according to claim 10, wherein the pre-determined value is 15 degrees.

12. The method of gesture selection according to claim 9, further comprising the step of:
    evaluating metadata for each of the dynamic lexical elements encompassed in the selection area to determine whether a center of the dynamic lexical elements is within the selection area.

13. The method of gesture selection according to claim 1, further comprising the step of:
    evaluating metadata for each of the dynamic lexical elements encompassed in the selection area to determine whether a center of the dynamic lexical elements is within the selection area.

14. The method of gesture selection according to claim 1, further comprising the step of:
    using a center coordinates method to determine an eligibility of each of the dynamic lexical elements encompassed within the selection area.

15. The method of gesture selection according to claim 14, further comprising the step of:
    evaluating metadata for each of the dynamic lexical elements encompassed within the selection area, to determine whether the center of the object is within an enclosed area.

16. The method of gesture selection according to claim 15, further comprising the step of:
    including the dynamic lexical elements encompassed within the selection area in a subset to be stored in a memory device when the center of each of the dynamic lexical elements is found to be within the selection area.

17. The method of gesture selection according to claim 16, further comprising the step of:

defining the selection area by the completed continuous arc.

18. The method of gesture selection according to claim 16, further comprising the step of:
including fully overlapped dynamic lexical elements in the selection area, including the fully overlapped dynamic lexical elements in the selection subset and storing in the memory device.

19. The method of gesture selection according to claim 18, further comprising the step of:
including in the selection subset stored in the memory device the dynamic lexical elements partially overlapped by the selection area having its center inside the selection area.

20. The method of gesture selection according to claim 18, further comprising the step of:
excluding from the selection subset the dynamic lexical elements partially overlapped by the selection area having its center outside the selection area.

21. The method of gesture selection according to claim 18, further comprising the step of:
excluding from the selection subset the dynamic lexical elements outside the selection area.

22. A method of gesture selection of displayed content on a mobile device, comprising the steps of:
making a gesture initiation on a touch screen display positioned in a rectangular frame of the mobile device with a finger or a stylus,
determining a gesture initiation location when a user pushes down on the touch screen display,
determining a continuous arc by movement of the user across the touch screen display;
determining a completed continuous arc of the continuous arc by connecting the gesture initiation location with a gesture end location when the user lifts off of the touch screen display;
determining a selection area based on an inner area of the completed continuous arc;
activating a microphone positioned along an edge of the frame of the mobile device by the determination of the selection area,
creating an audio input signal by a user,
receiving the audio input signal in the microphone,
creating an audio input signal recording based on the audio input signal received in the microphone;
storing the audio input signal recording;
analyzing the audio input signal recording by a central processing unit;
outputting an audio output signal through a speaker mounted along a periphery of the frame at a distance from the microphone; and
storing data from objects of interest encompassed in the selection area.

* * * * *

UNITED STATES PATENT AND TRADEMARK OFFICE
CERTIFICATE OF CORRECTION

PATENT NO. : 10,497,280 B2
APPLICATION NO. : 15/234513
DATED : December 3, 2019
INVENTOR(S) : Michael John Mathias et al.

Page 1 of 1

It is certified that error appears in the above-identified patent and that said Letters Patent is hereby corrected as shown below:

In the Claims

In Column 8, Line 11, Claim 5, delete "(a)" and insert -- (α) --

In Column 8, Line 28, Claim 9, delete "(a)" and insert -- (α) --

Signed and Sealed this
Twenty-fourth Day of November, 2020

Andrei Iancu
*Director of the United States Patent and Trademark Office*